(12) United States Patent
Amatucci

(10) Patent No.: US 7,371,338 B2
(45) Date of Patent: May 13, 2008

(54) METAL FLUORIDES AS ELECTRODE MATERIALS

(75) Inventor: Glenn G. Amatucci, Peapack, NJ (US)

(73) Assignee: Rutgers, The State University, New Brunswick, NJ (US)

( * ) Notice: Subject to any disclaimer, the term of this patent is extended or adjusted under 35 U.S.C. 154(b) by 706 days.

(21) Appl. No.: 10/721,924

(22) Filed: Nov. 25, 2003

(65) Prior Publication Data

US 2004/0121235 A1      Jun. 24, 2004

Related U.S. Application Data

(63) Continuation-in-part of application No. 10/261,863, filed on Oct. 1, 2002.

(60) Provisional application No. 60/429,492, filed on Nov. 27, 2002.

(51) Int. Cl.
*H01B 1/02* (2006.01)
*H01B 1/06* (2006.01)

(52) U.S. Cl. ............... 252/518.1; 252/506; 429/231.9; 429/231.95

(58) Field of Classification Search .............. 252/500, 252/506, 518.1; 429/231.95, 231.9
See application file for complete search history.

(56) References Cited

U.S. PATENT DOCUMENTS 5,759,720 A      6/1998  Amatucci ................. 429/224
6,645,452 B1 *  11/2003  Barker et al. .............. 423/306
6,756,155 B1 *   6/2004  Kweon et al. ......... 429/231.95
6,974,486 B1 *  12/2005  Kweon et al. ............ 29/623.1
2002/0168573 A1  11/2002  Baker et al.

FOREIGN PATENT DOCUMENTS

KR      2001063879     *  7/2001
WO   WO 2004/034489 A2 *  4/2004

OTHER PUBLICATIONS

Li et al., "Reversible formation and decomposition of LiF clusters using transition metal fluorides as precursors and their application in rechargeable Li batteries," Advanced Materials, 2003, 15 (9), pp. 736-739.*
Roth, Marcel, et al., "Nanocrystalline LiF via Microemulsion Systems", Journal Mater. Chem., 1999, 9, pp. 493-497.
Badway, F., et al., "Carbon-Metal Fluoride Nanocomposites—Structure and Electrochemistry of $FeF_3$:C", Journal of the Electromechanical Society, 2003, 150 (9), pp. A1209-A1218.
Badway, F., et al., "Carbon Metal Fluoride Nanocomposites—High-Capacity Reversible Metal Fluoride Conversion Materials as Rechargeable Positive Electrodes for Li Batteries", Journal of the Electrochemical Society, 2003, 150 (10), pp. A1318-A1327.

* cited by examiner

*Primary Examiner*—Lorna M. Douyon
*Assistant Examiner*—Jaison Thomas
(74) *Attorney, Agent, or Firm*—WolfBlock LLP; Beverly W. Lubit

(57) ABSTRACT

Safe and economical electrochemically active nanocomposites based on metal fluoride compounds useful in rechargeable battery cell electrodes. When incorporated as the active electrode material in lithium battery cell systems, the nanocomposites enable high, stable specific capacities.

26 Claims, 15 Drawing Sheets

METAL FLUORIDES AS ELECTRODE MATERIALS

This application is a continuation-in-part of U.S. application Ser. No. 10/261,863 filed Oct. 1, 2002, entitled Transition Metal Fluoride: Carbon Nanoamalgam Rechargeable Battery Cell Electrode Material, by G. Amatucci, which application is hereby incorporated herein by reference.

This application claims the benefit of U.S. Provisional Application No. 60/429,492 filed Nov. 27, 2002, entitled Transition Metal Fluoride Plus Metal as Positive Electrode Materials for Lithium Ion Batteries, by G. Amatucci, which application is hereby incorporated herein by reference.

1. FIELD

The present invention relates to rechargeable electrochemical energy storage systems, particularly to such systems, such as battery cells, comprising materials capable of reversibly taking up and releasing lithium ions as a means of storing and supplying electrical energy. More specifically, the invention relates to the formation and utilization of nanostructure transition metal fluoride:carbon composites, or nanocomposites, as active electrode component materials in fabricating electrochemical cells, such as lithium battery cells, capable of exhibiting high specific capacity at high recharge rates.

2. BACKGROUND

The Li-ion battery is the premiere high-energy rechargeable energy storage technology of the present day. Unfortunately, its high performance still falls short of energy density goals in applications ranging from telecommunications to biomedical. Although a number of factors within the battery cell contribute to this performance parameter, the most crucial ones relate to how much energy can be stored in the electrode materials of the device.

During the course of development of rechargeable electrochemical cells, such as lithium and lithium-ion battery cells and the like, numerous materials capable of reversibly accommodating lithium ions have been investigated. Among these, occlusion and intercalation materials, such a carbonaceous and graphitic compounds, and transitions metal oxide spinels, have proved to be particularly well-suited to such applications. However, even while performing reasonably well in such recycling electrical storage systems of significant capacity, many of these materials exhibit detrimental properties, such as marginal environmental compatibility and safety, which detract from the ultimate acceptability of the rechargeable cell devices. In addition, some of the more promising materials are available only at costs that limit widespread use.

Materials of choice in the fabrication of rechargeable battery cells, particularly highly desirable and broadly implemented Li-ion cells, have for some considerable time centered upon graphitic negative electrode compositions which provide respectable capacity levels in the range of 300 mAh/g. Complementary positive electrode materials in present cells comprise the less effective layered intercalation compounds, such as $LiCoO_2$ which generally provides capacities in the range of 150 mAh/g. Alternative intercalation materials, such as $LiNiO_2$ and $LiMn_2O_4$, have more recently gained favor in the industry, since, although exhibiting no greater specific capacity, these compounds are available at lower cost and, further, provide a greater margin of environmental acceptability.

Due to the increasing demand for ever more compact electrical energy storage and delivery systems for all manner of advancing technologies, from biomedical to telecommunications, the search continues for battery cell materials capable, on the one hand, of providing greater specific capacity over wider ranges of cycling speeds, voltages, and operating temperatures while, on the other hand, presenting fewer environmental hazards and greater availability at lower processing and fabrication costs. Searches for more effective positive electrode materials in particular have become far-reaching with attention turning more frequently to the abundant lower toxicity transition metal compounds, which are typically accessible at economical costs.

In this latter respect compounds of iron, e.g., iron oxides, attracted some attention. However, although exhibiting electrochemical activity, iron oxides were found to function appropriately only at voltages which are too low for practical implementation in rechargeable lithium and lithium-ion battery cells.

Upon further consideration of the economic advantages possibly attainable in transition metal compounds, interest shifted to examination of the more active fluoride compounds. Investigations into such use of these fluorides confirmed, however, that, while the open structures of the transition metal fluorides support the good ionic conductivity essential, in part, for useful electrode performance, the large band gap induced by the highly ionic character of the metal:halogen bond results in poor electronic conductivity. Without this latter essential conductive property to complement proven ionic conductivity, the transition metal fluorides were considered virtually useless as lithium battery electrode materials.

Despite the inconsequential performance of the transition metal fluorides in typical rechargeable cell fabrications, the theoretical promise of output voltages in the range of 3 V, due to the high ionicity of the compound bonds, prompted some further investigations into metal halides for use in electrode compositions. Increasing the electrical conductivity of iron trifluoride ($FeF_3$) was attempted by incorporating it in an electrode composition comprising the admixture of about 25 parts acetylene black to 70 parts of $FeF_3$. Arai et al., 68 J. Power Sources 716-719 (1997). The performance of such a cell, despite the impractically low charge/discharge rate which extended over a 60 hour cycle period, was marginal at a discharge capacity over 4.5 to 2.0 V of only about 80 mAh/g vis-à-vis a theoretical (1e transfer) capacity of 237 mAh/g. Subsequent independent fabrication and testing of similar battery cells at more realistic 4 hour cycle rates would yield no more than about 50 mAh/g.

What is needed are electrical energy-storage and delivery systems that provide high specific capacity over wide cycling-speed ranges, voltages, and operating temperatures; are environmentally friendly; and also are readily available at practical processing and fabrication costs.

3. SUMMARY

In one embodiment, the invention provides the means for realizing the potential improvement in rechargeable electrochemical battery cell systems which takes advantage of the low cost and desirable environmental compatibility of metal fluoride-based systems to achieve cells providing stable and surprisingly high capacity at rapid cycle rates over broad voltage ranges.

In one embodiment of the invention, the heretofore unacceptably low level of electronic conductivity exhibited by electrochemical cell electrode compositions comprising metal fluorides has been resolved by use of carbon metal fluoride nanocomposites referred to herein as "carbon metal fluoride nanocomposites" ("CMFNCs") in the positive electrode of the electrochemical cell, such as in rechargeable batteries.

In another embodiment, the invention is directed to nanocomposites comprising a lithium fluoride compound herein referred to as "lithium fluoride compound nanocomposites" ("LFCNCs"). LFCNCs are useful as the positive electrode material of electrochemical cells, such as rechargeable batteries. In one embodiment, the lithium fluoride compound nanocomposites of the invention optionally comprise an elemental metal. In another embodiment, the lithium fluoride compound nanocomposites of the invention optionally comprise elemental carbon. In still another embodiment, the lithium fluoride compound nanocomposites of the invention comprise both an elemental metal and elemental carbon.

4. BRIEF DESCRIPTION OF THE FIGURES

These and other features, aspects, and advantages of the present invention will become better understood with regard to the following description, appended claims, and accompanying figures where:

Figure 4:
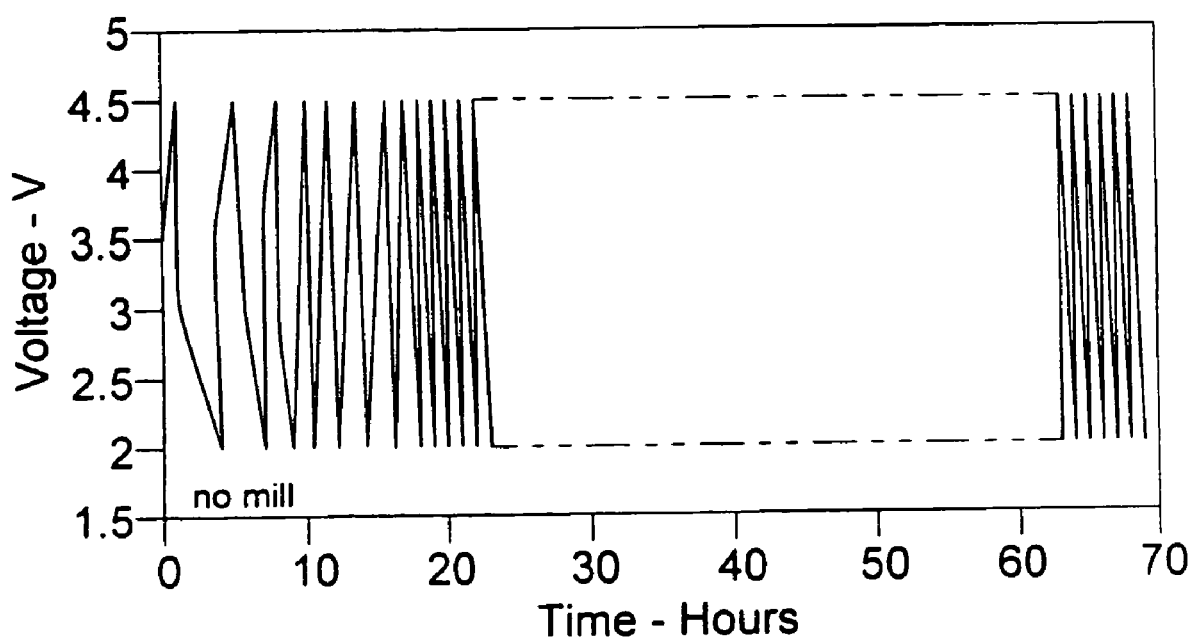
Figure 5:
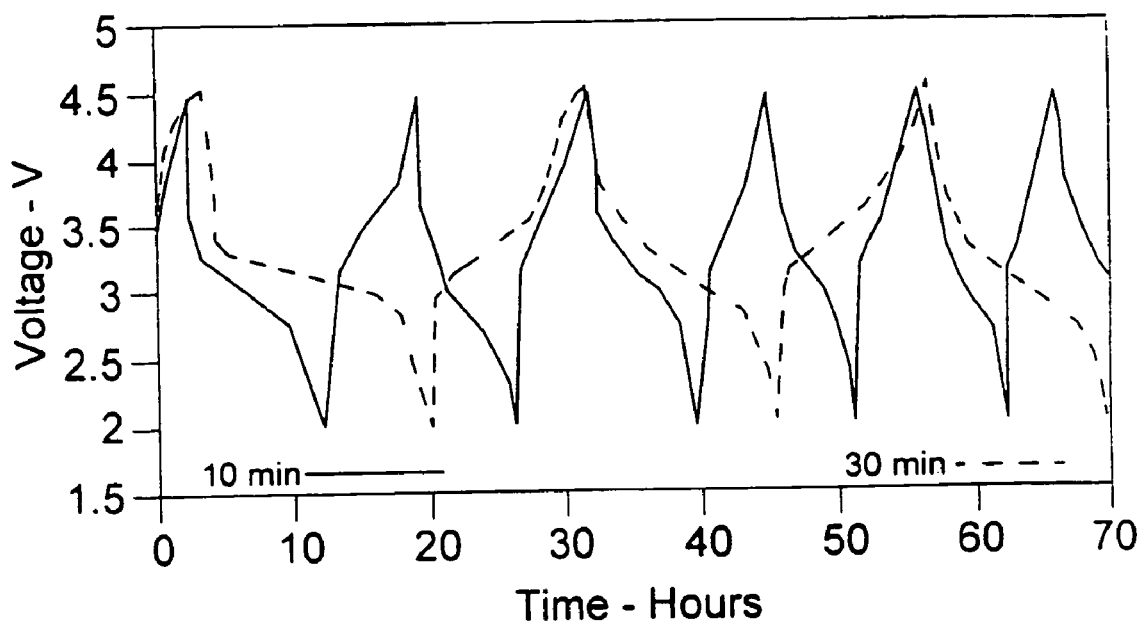
Figure 6:
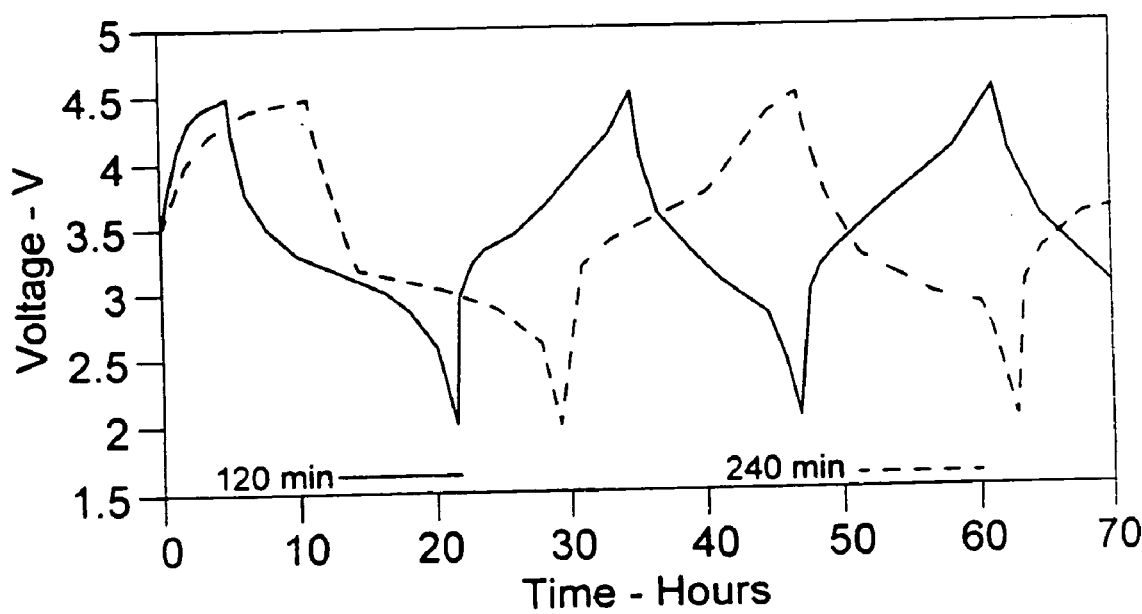
Figure 7:
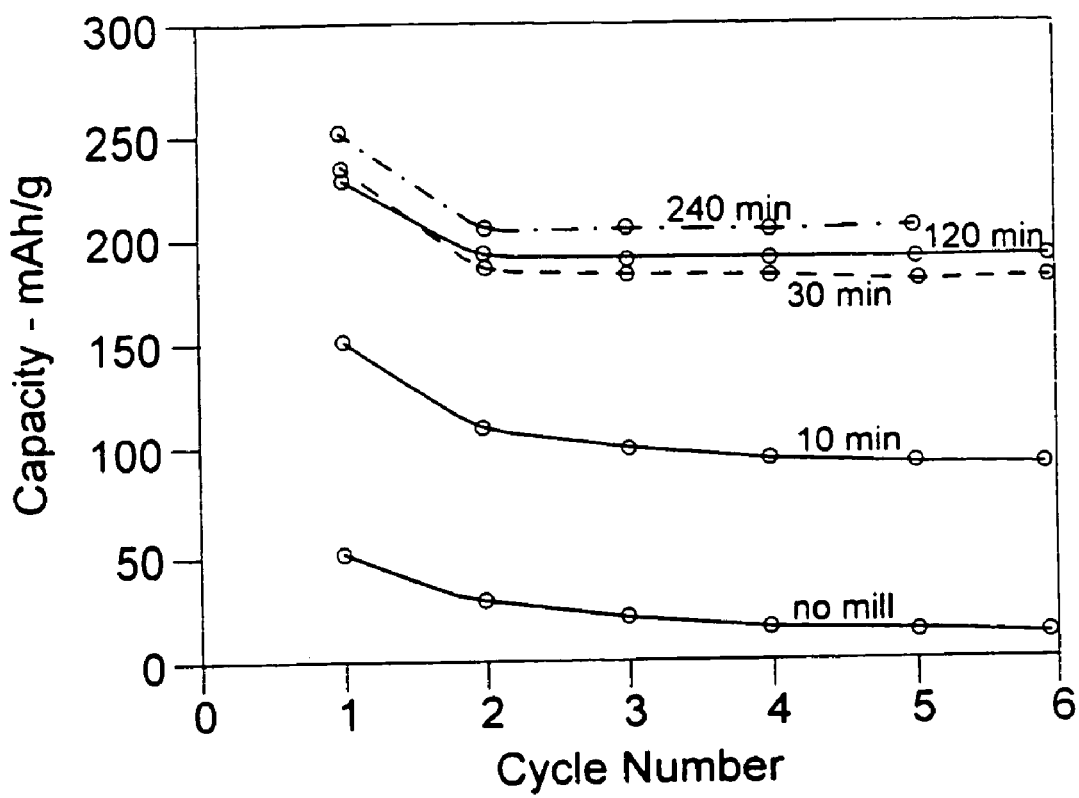
Figure 8:
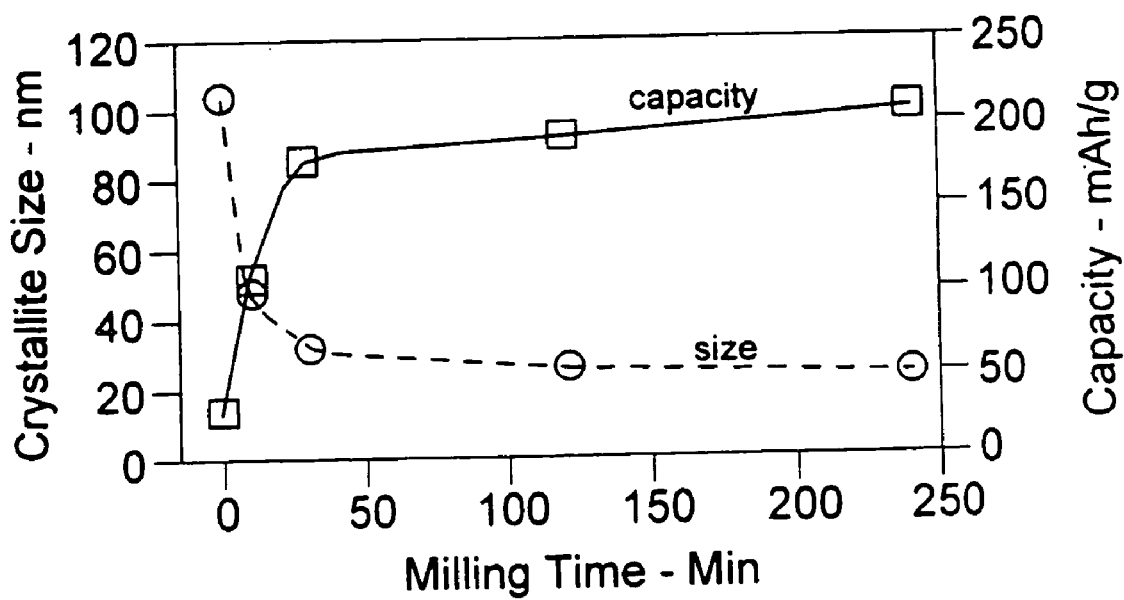
Figure 9:
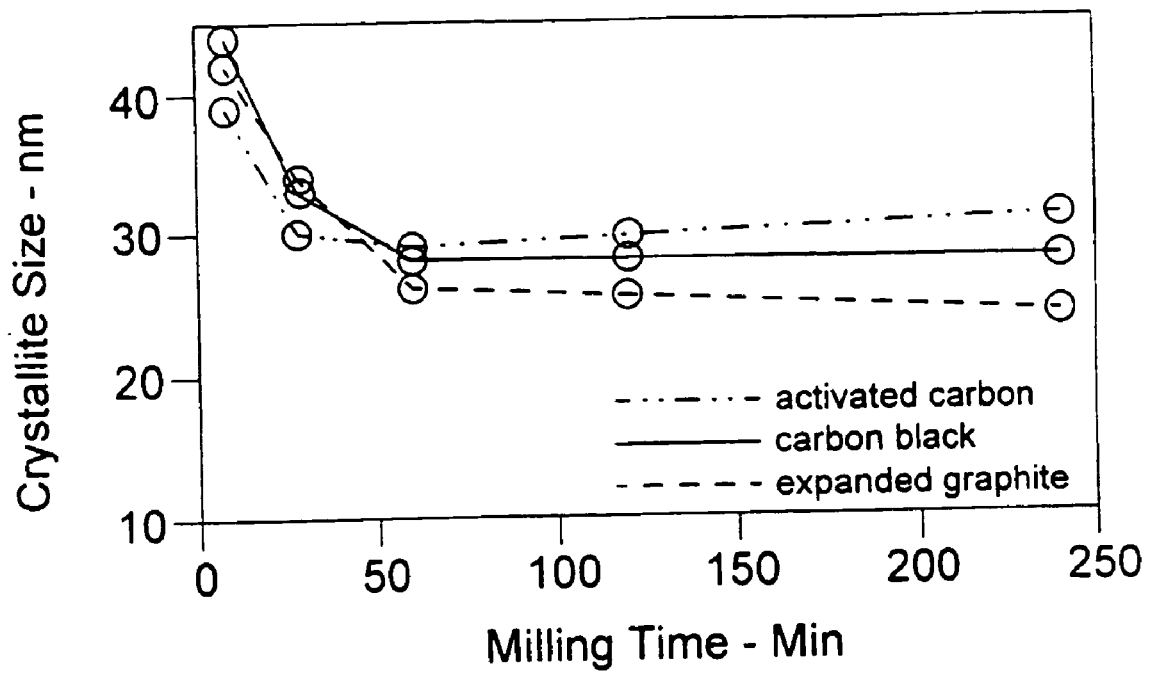
Figure 10:
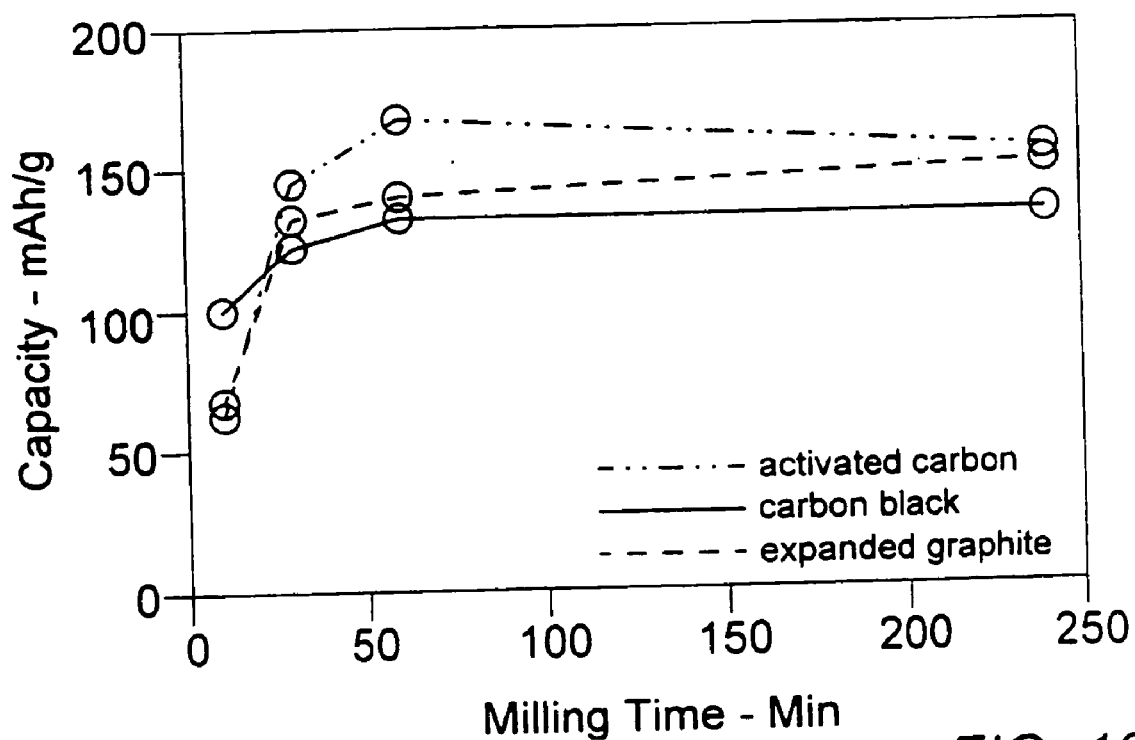
Figure 11:
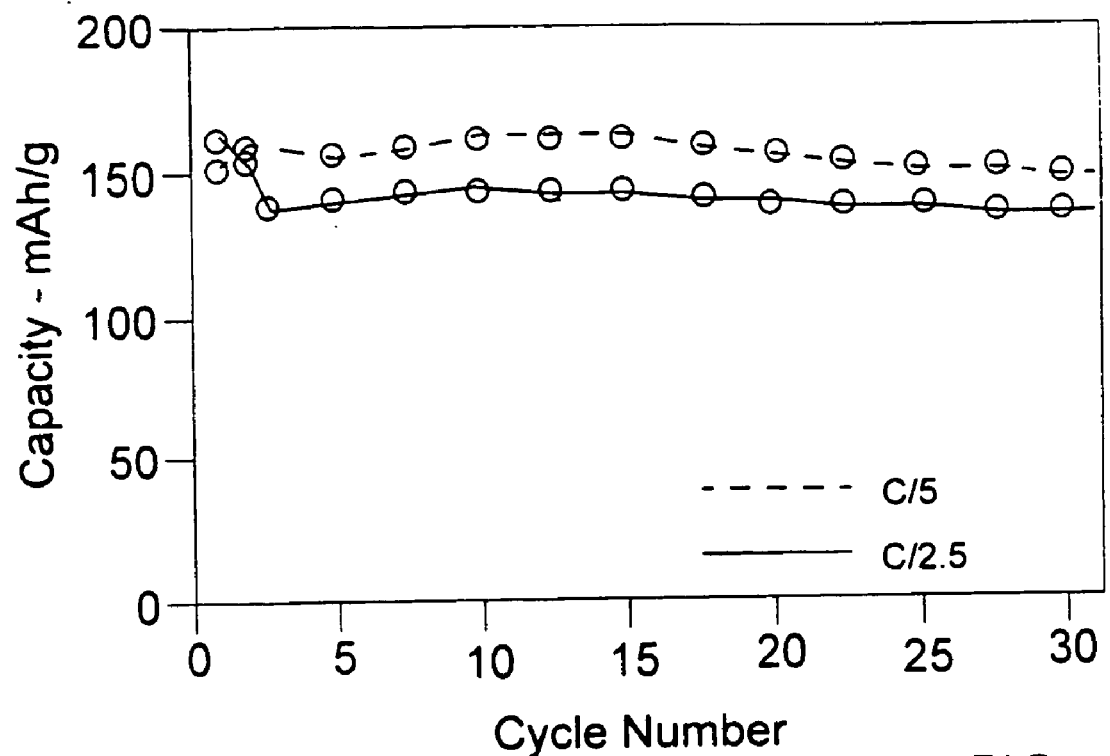
Figure 12:
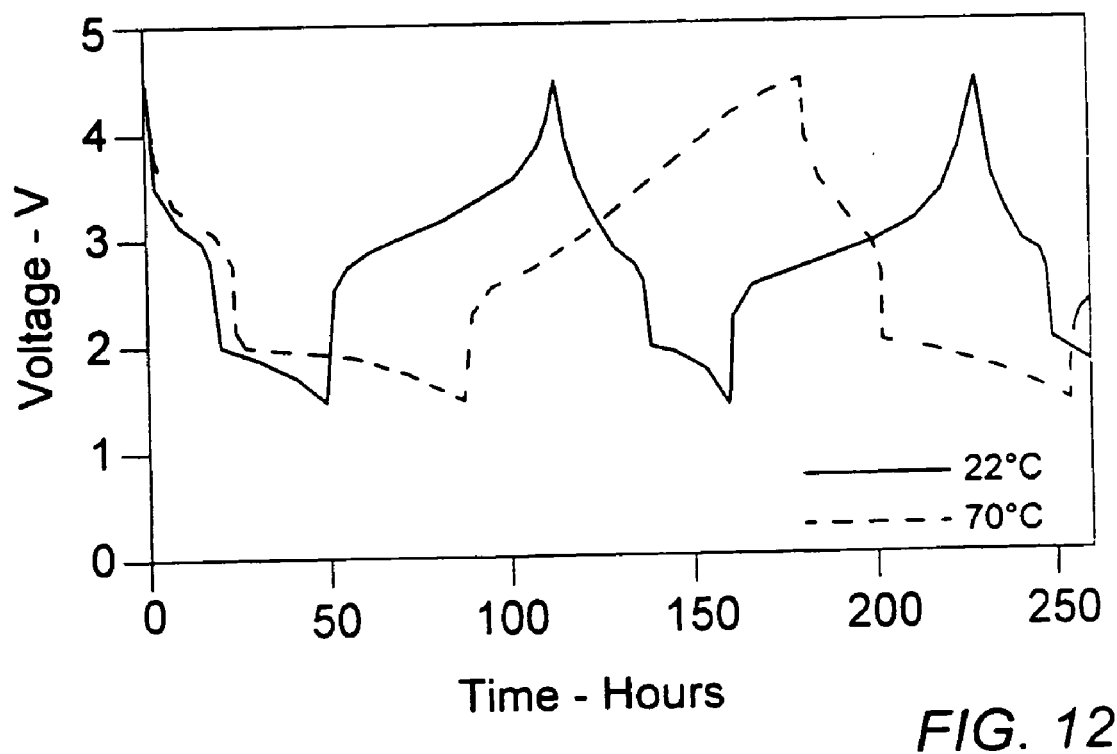
Figure 13:
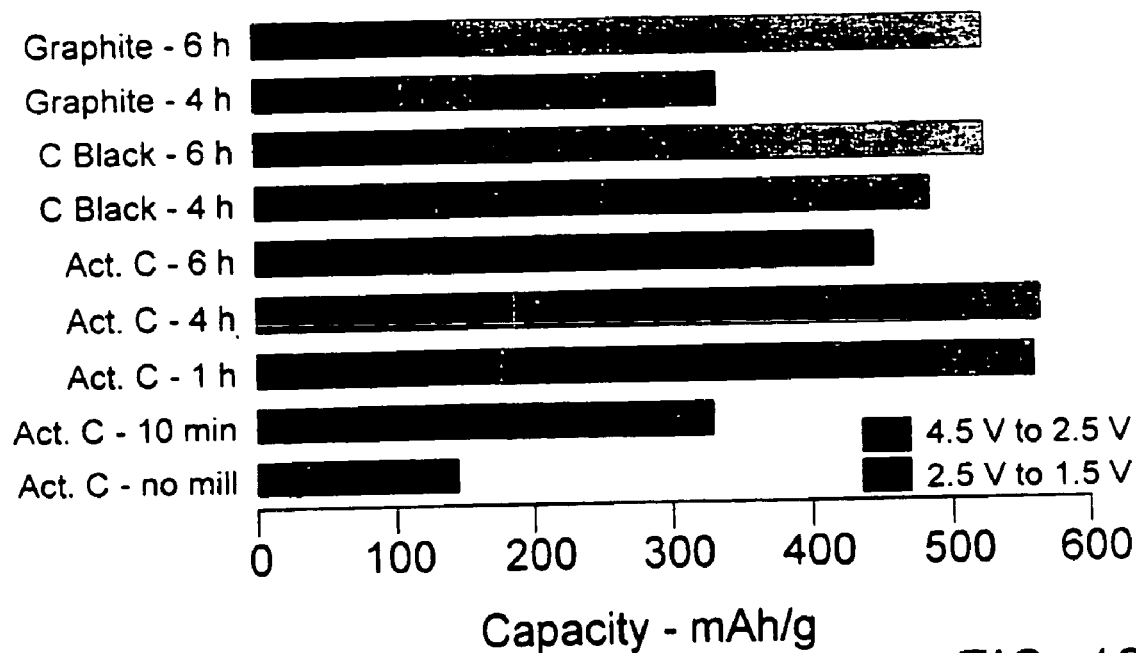
Figure 14:
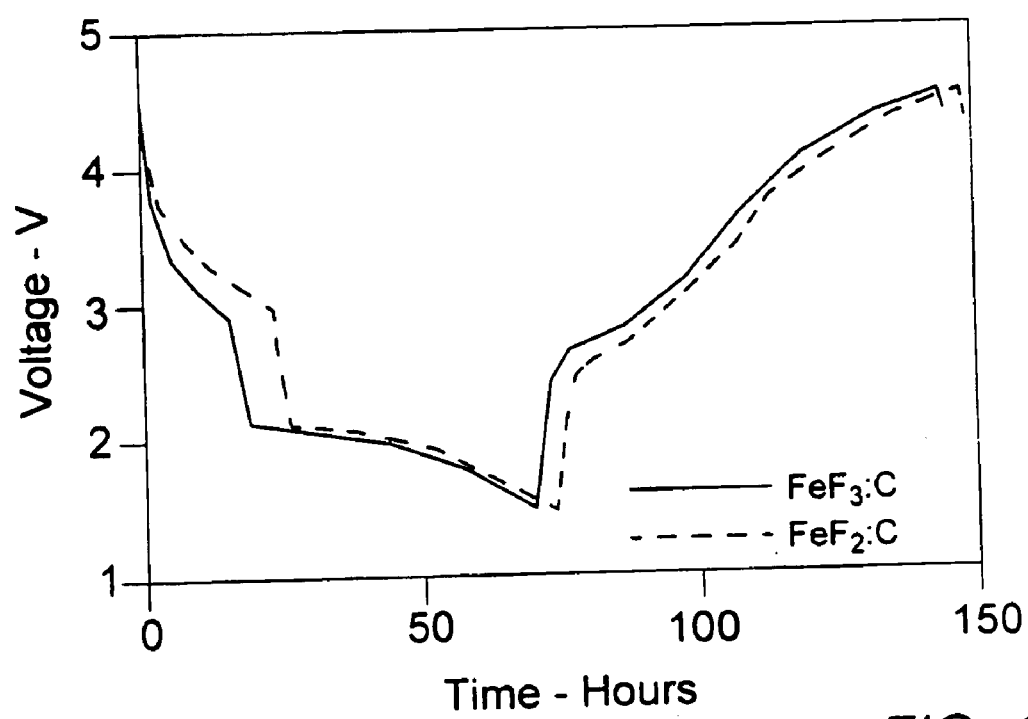
Figure 15:
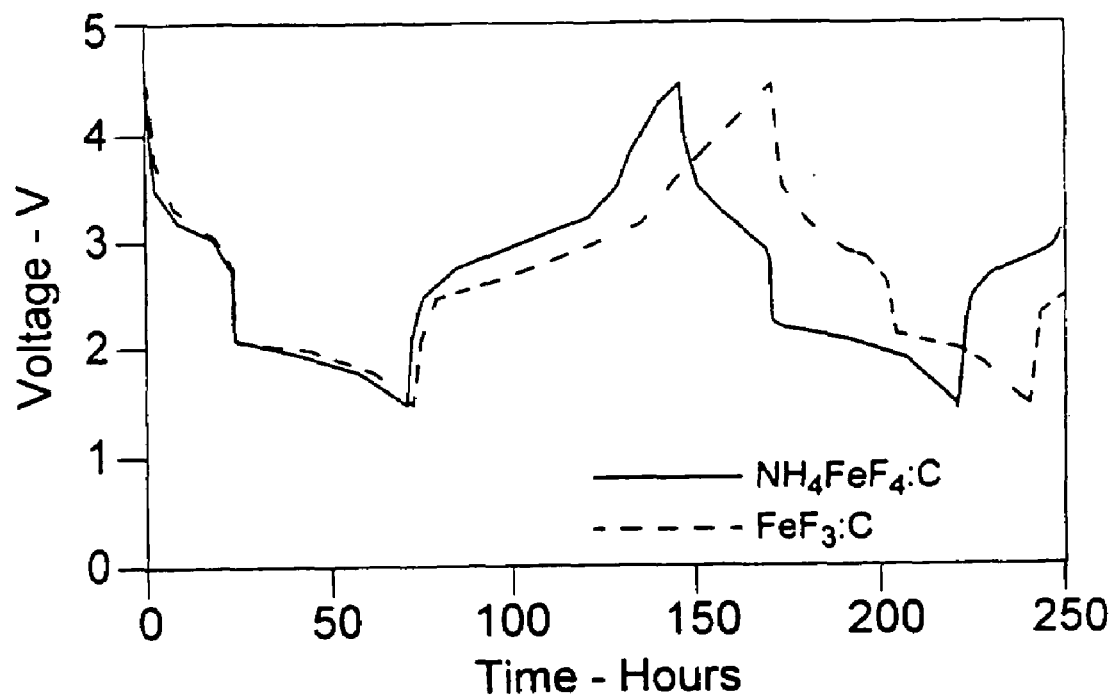
Figure 16:
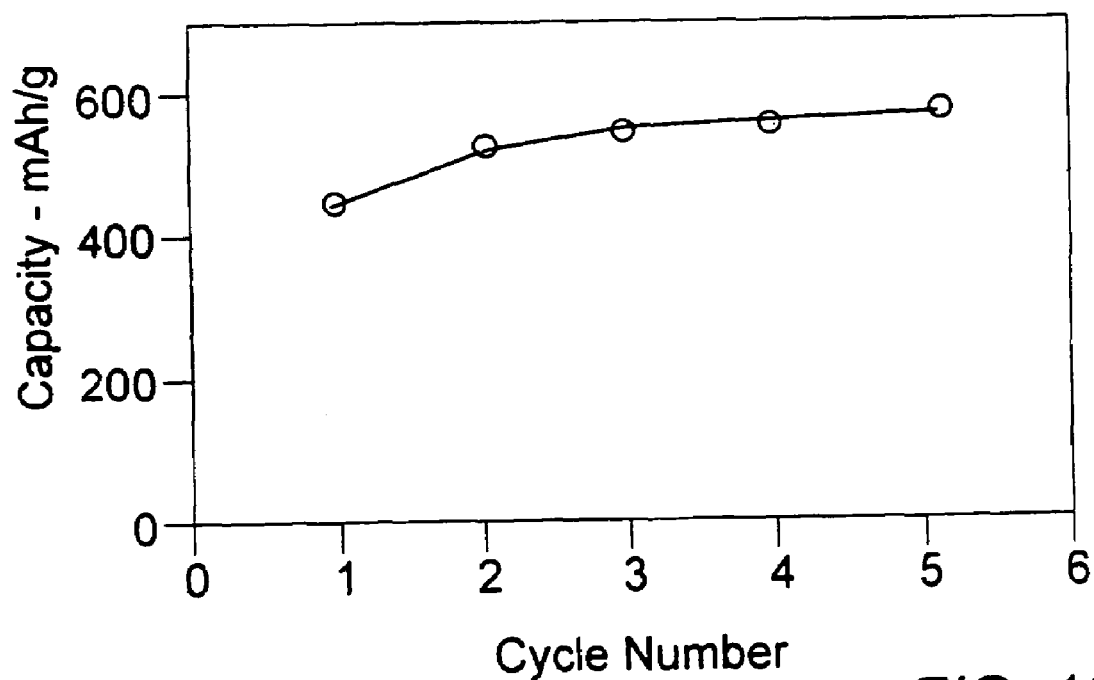
Figure 17:
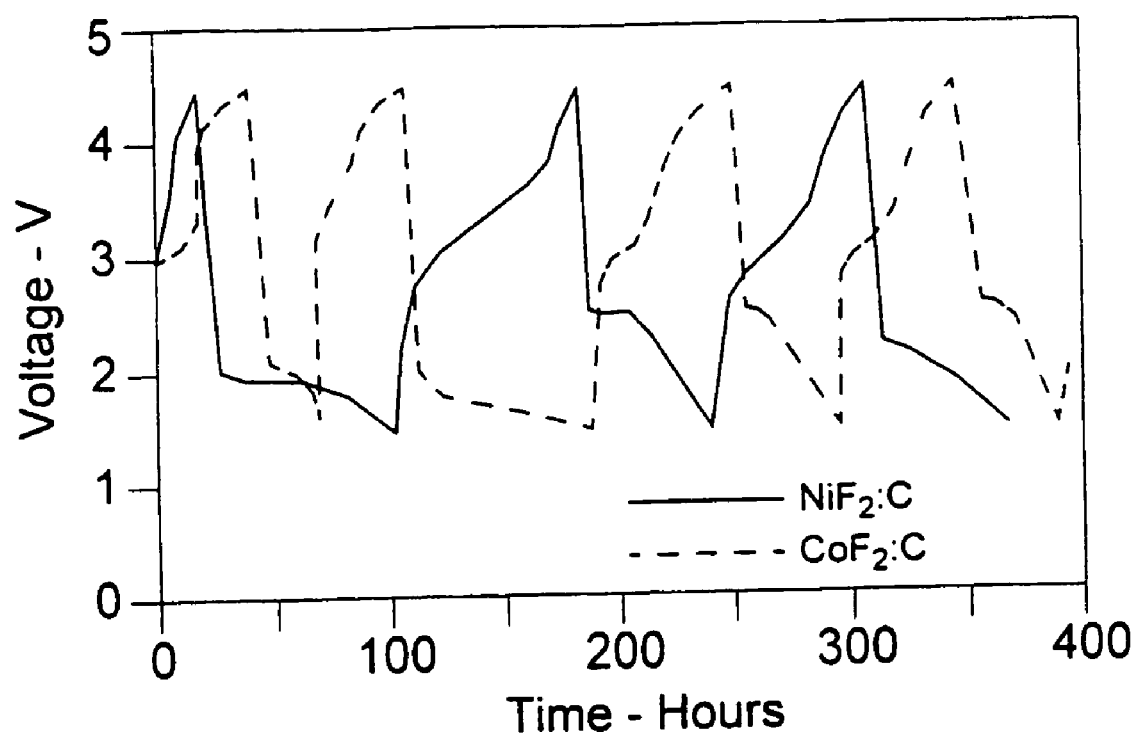
Figure 18:
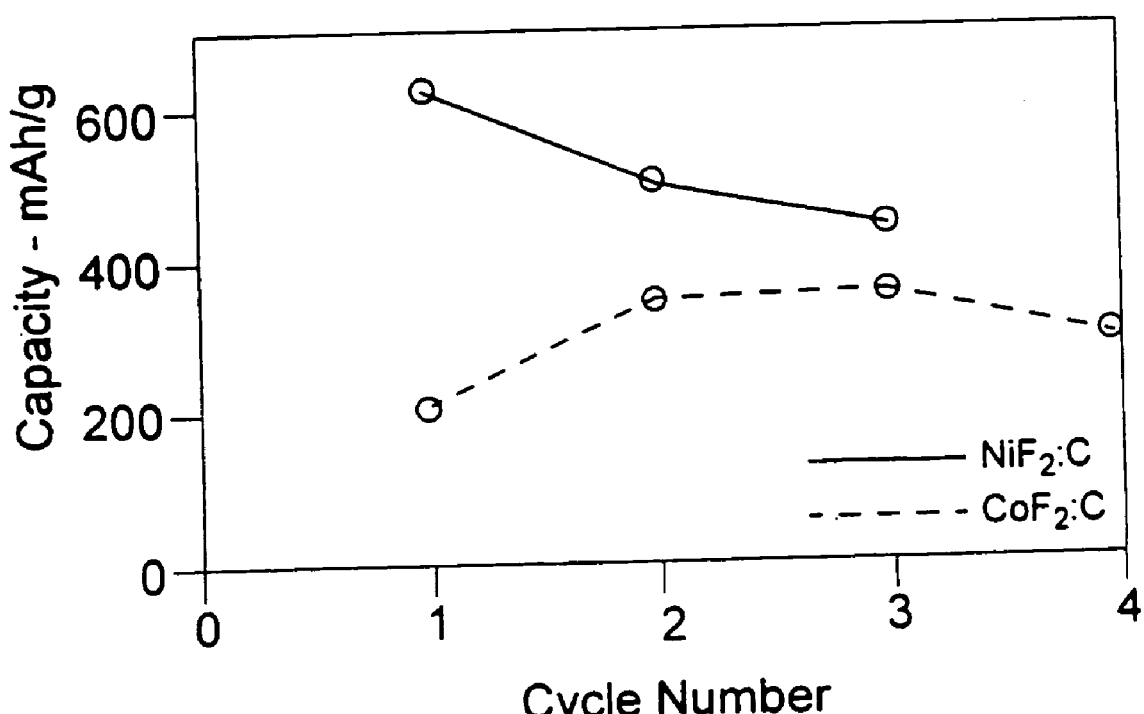

FIG. 4 is a graph plotting the characteristic profile of recycling voltage between 4.5 V and 2.0 V at 22° C. over a cycling period of about 70 hours in a cell having a positive electrode comprising a simple, unmilled mechanical mixture of nanostructure transition metal fluoride and carbon particles;

FIG. 5 is an overlay graph plotting the characteristic profiles of recycling voltage between 4.5 V and 2.0 V at 22° C. over a cycling period of about 70 hours in cells embodying the present invention and comprising carbon metal fluoride nanocomposite material obtained from high energy impact milling for 10 and 30 minutes, respectively;

FIG. 6 is an overlay graph plotting the characteristic profiles of recycling voltage between 4.5 V and 2.0 V at 22° C. over a cycling period of about 70 hours in cells embodying the present invention and comprising carbon metal fluoride nanocomposite material obtained from high energy impact milling for 120 and 240 minutes, respectively;

FIG. 7 is an overlay graph plotting the variation in cell specific capacity over the indicated cycling period in the cell embodiments of FIGS. 4-6;

FIG. 8 is an overlay graph plotting the comparative variations in carbon metal fluoride nanocomposite crystallite size and cell specific capacity as a function of high energy impact milling time in cells comprising one embodiment of the present invention;

FIG. 9 is an overlay graph plotting the comparative variations in carbon metal fluoride nanocomposite crystallite size as a function of high energy impact milling time for nanocomposites comprising various carbon types;

FIG. 10 is an overlay graph plotting the comparative variations in cell specific capacity as a function of high energy impact milling time of carbon metal fluoride nanocomposite cell electrode material comprising various carbon types;

FIG. 11 is an overlay graph plotting the comparative variations in cell specific capacity over the indicated number of cycles as a function of cycling rate in cells embodying a carbon metal fluoride nanocomposite cell electrode material of the present invention;

FIG. 12 is an overlay graph plotting the respective characteristic profiles of recycling voltage between 4.5 V and 1.5 V at 22° C. and 70° C. over a cycling period of about 250 hours in cells embodying a carbon metal fluoride nanocomposite cell electrode material of the present invention;

FIG. 13 is a chart depicting comparative third cycle discharge capacities as a function of carbon type and high energy impact milling time and of discharge voltage spans between 4.5 V and 2.5 V and between 2.5 V and 1.5 V at 70° C. in cells embodying $FeF_3$:carbon nanocomposite cell electrode materials of the present invention;

FIG. 14 is an overlay graph plotting the respective characteristic profiles of recycling voltage between 4.5 V and 1.5 V at 70° C. over a cycling period of about 150 hours in cells comprising varying embodiments of carbon metal fluoride nanocomposite cell electrode materials of the present invention;

FIG. 15 is-an overlay graph plotting the respective characteristic profiles of recycling voltage between 4.5 V and 1.5 V at 70° C. over a cycling period of about 250 hours in cells comprising other varying embodiments of carbon metal fluoride nanocomposite cell electrode materials of the present invention;

FIG. 16 is a graph plotting variations in Cell specific capacity over the indicated number of cycles in a cell embodying the substituted metal fluoride:carbon nanocomposite cell electrode material of FIG. 15;

FIG. 17 is an overlay graph plotting the respective characteristic profiles of recycling voltage between 4.5 V and 1.5 V at 70° C. over a cycling period of about 400 hours in cells comprising yet other varying embodiments of carbon metal fluoride nanocomposite cell electrode materials of the present invention; and FIG. 18 is a graph plotting variations in cell specific capacity over the indicated number of cycles in cells embodying the carbon metal fluoride nanocomposite cell electrode materials of FIG. 17.

Figure 19:
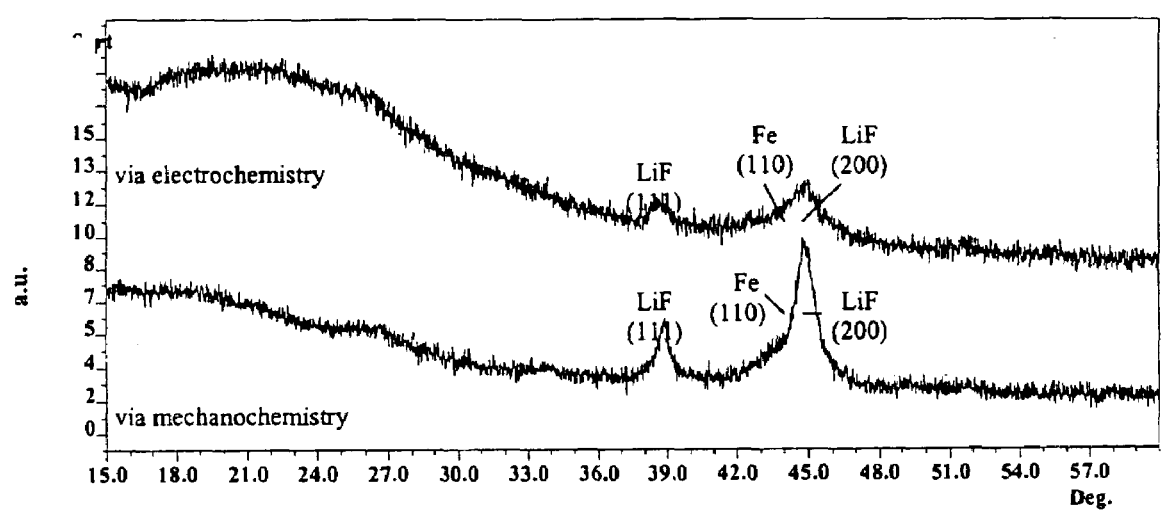
Figure 20:
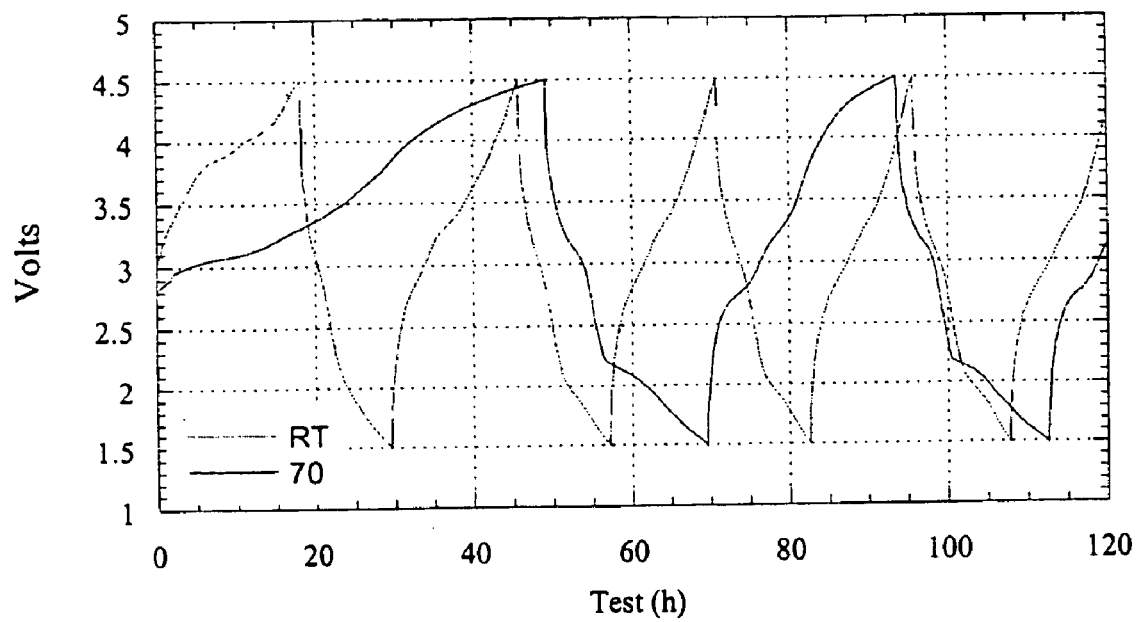
Figure 21:
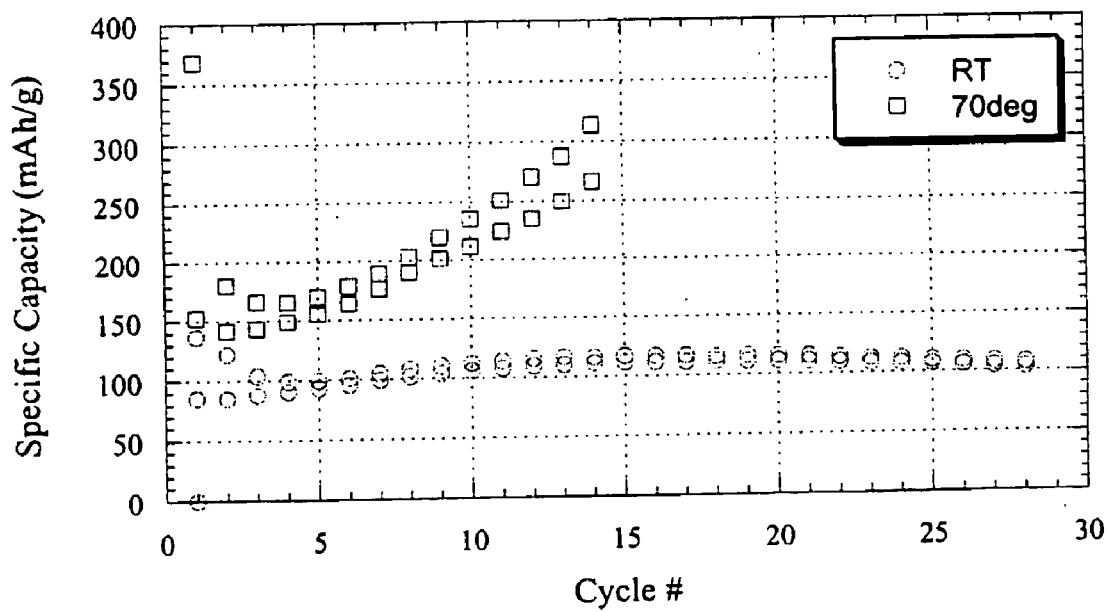
Figure 22:
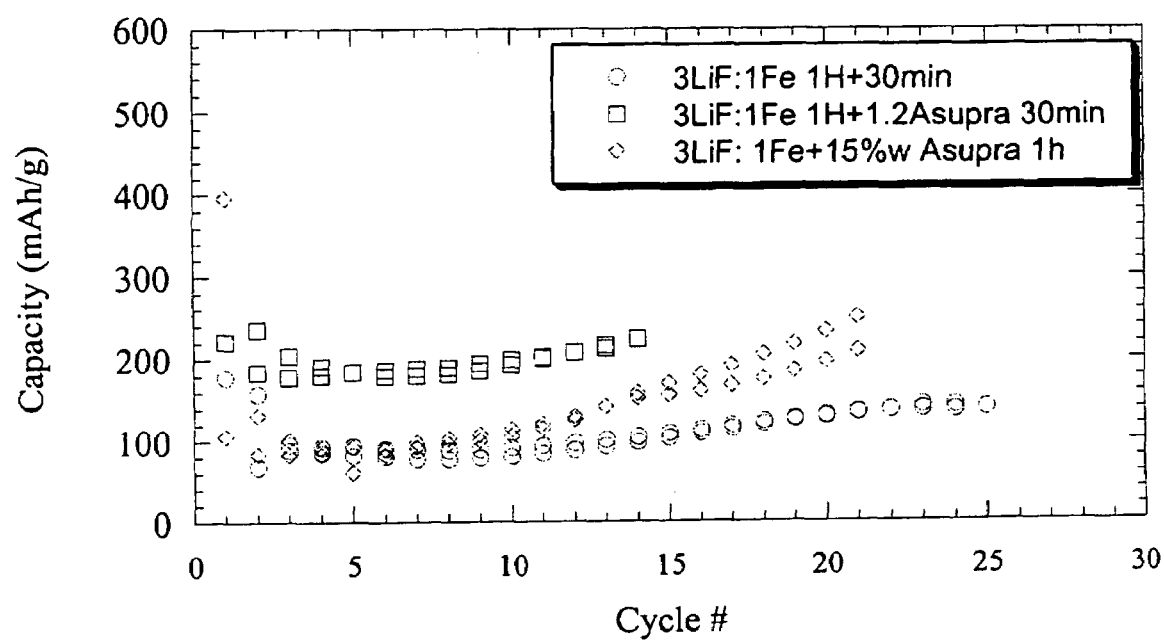
Figure 23:
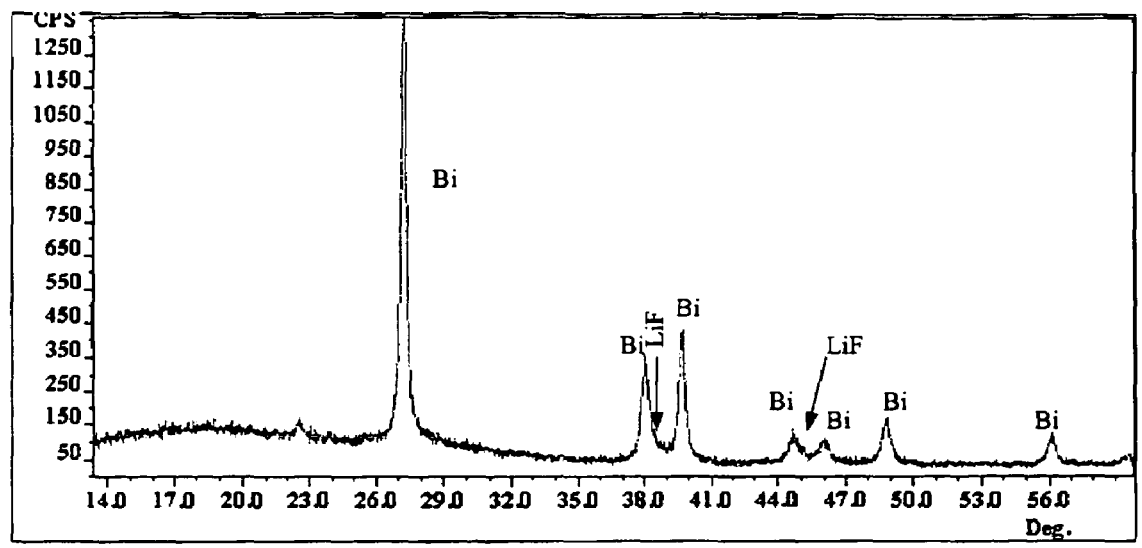
Figure 24:
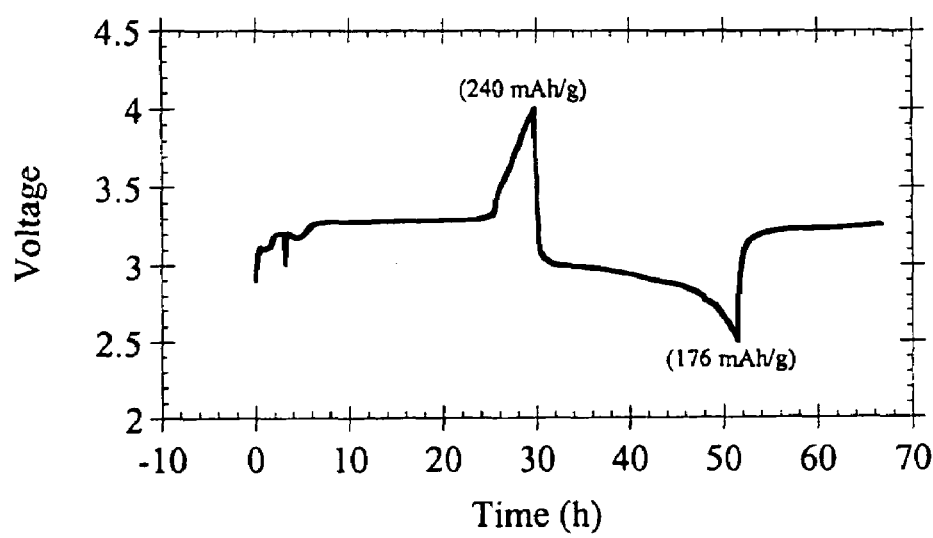
Figure 25:
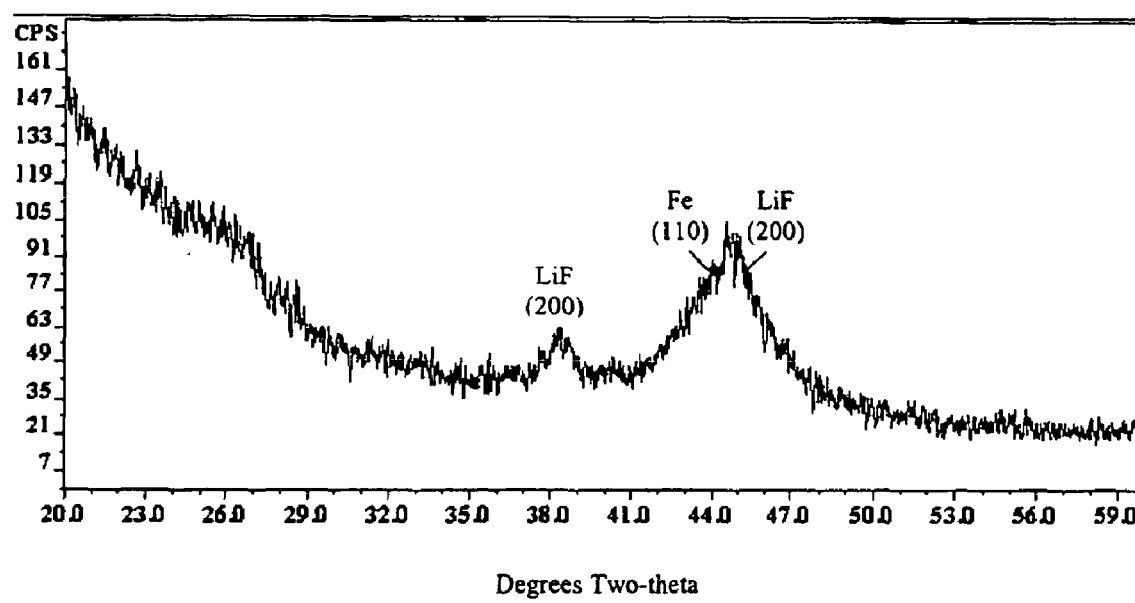
Figure 26:
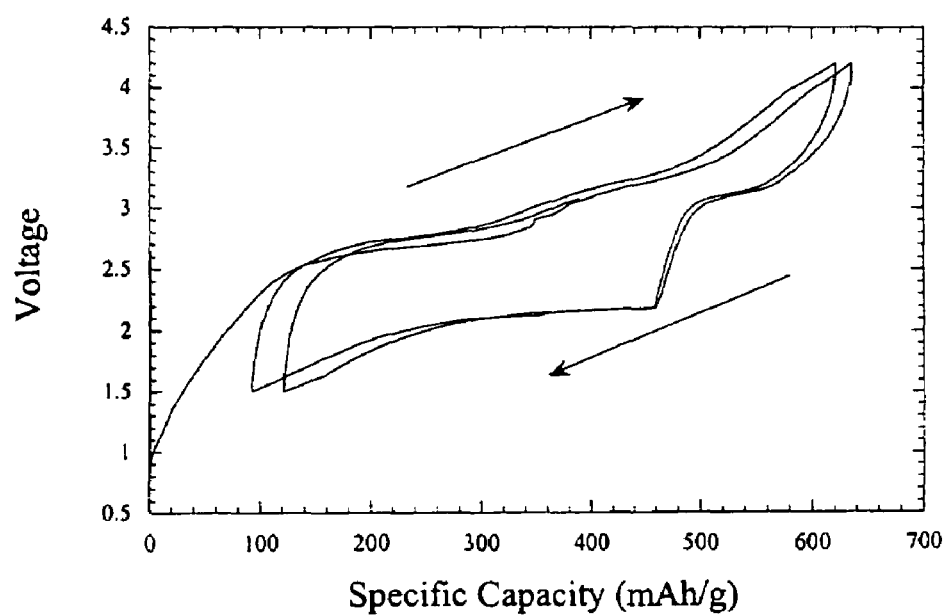
Figure 27:
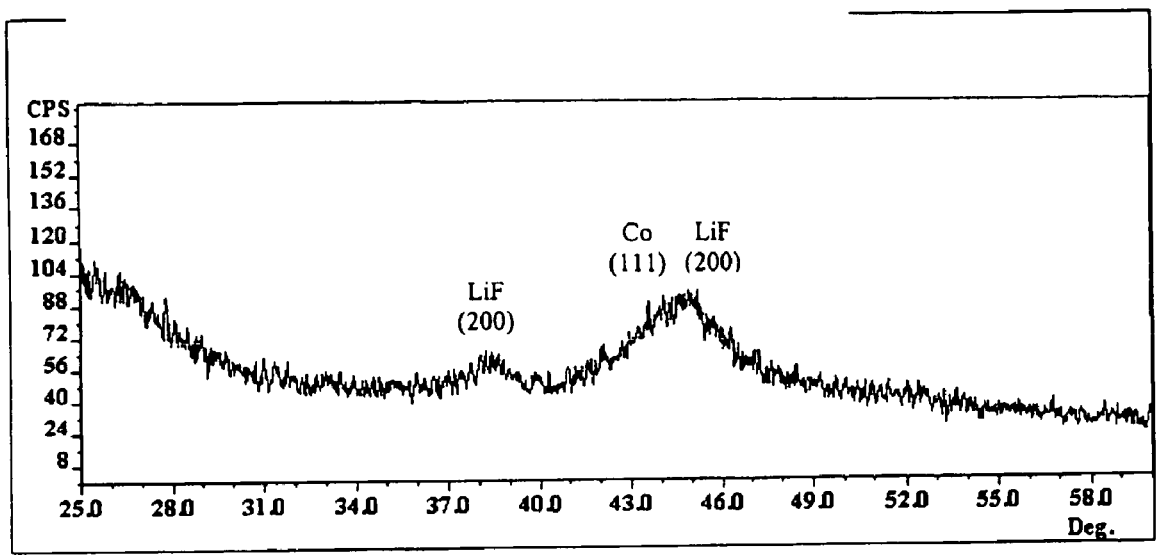
Figure 28:
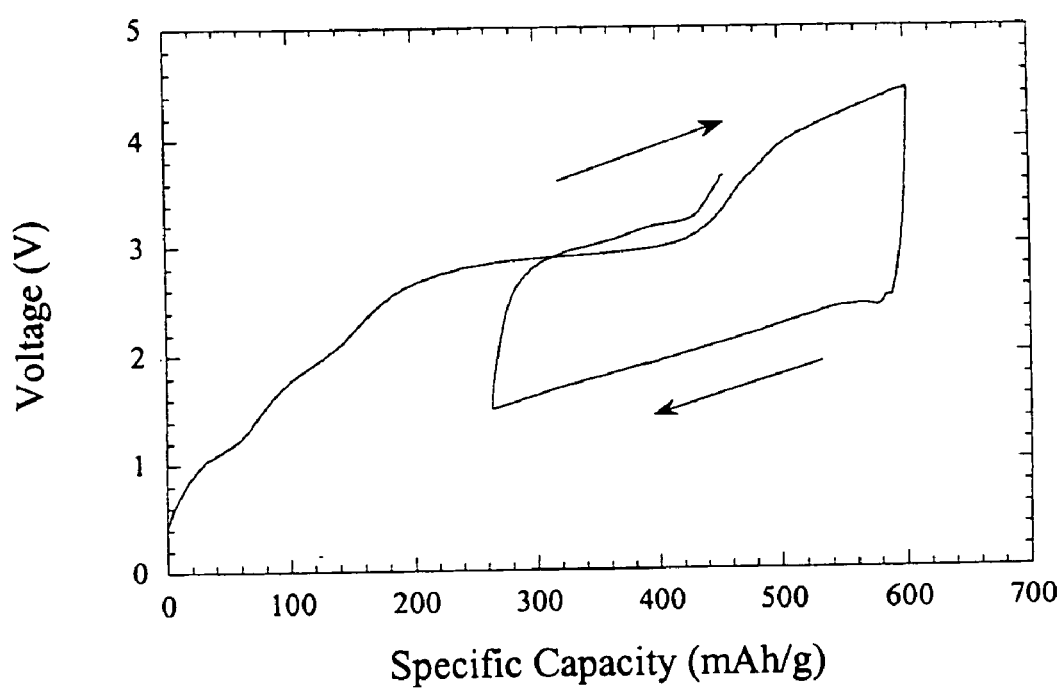

FIG. 19 shows the XRD patterns of ex-situ analysis of lithium fluoride compound nanocomposites of the invention post electrochemical and mechanochemical reduction of $FeF_3$:C CMFNCs with $Li^+$ or Li;

FIG. 20 shows the voltage profiles of lithium fluoride compound nanocomposites of the invention from 3LiF:Fe based electrodes fabricated by reduction of $FeF_3$:C CMFNCs with Li. The current is 7.58 mA/g;

FIG. 21 shows Specific capacity as function of cycle number for 3LiF:Fe samples;

FIG. 22 shows the specific capacity as function of cycle number for 3LiF:Fe based lithium fluoride compound nanocomposites of the invention fabricated by milling stoichiometric mixtures of LiF and Fe;

FIG. 23 shows X-ray diffraction pattern of 3LiF:Bi lithium fluoride compound nanocomposites of the invention;

FIG. 24 demonstrates the reversible electrochemical behavior of lithium fluoride compound nanocomposites of the invention comprising LiF:Bi incorporated in the positive electrodes of Li batteries;

FIG. 25 shows X-ray diffraction pattern of 3LiF:Fe lithium fluoride compound nanocomposites of the invention used in the positive electrode;

FIG. 26 shows charge/discharge voltage profile plotted vs. specific capacity for a cell containing a lithium fluoride compound nanocomposites of the invention of 3LiF:Fe as the positive electrode. Data was taken at a current of 7.58 mA/g material at 70° C.;

FIG. 27 shows the X-ray diffraction pattern of 2LiF:Co lithium fluoride compound nanocomposites of the invention used as the positive electrode. Peaks associated to LiF and Co are indicated; and FIG. 28 shows the charge/discharge voltage profile plotted vs. specific capacity for a cell containing a 2LiF:Co lithium fluoride compound nanocomposites of the invention as the positive electrode.

It is to be understood that these figures are for purposes of illustrating the concepts of the invention and are not necessarily to scale.

5. DETAILED DESCRIPTION

The carbon metal fluoride nanocomposites ("CMFNCs") and lithium fluoride compound nanocomposites ("LFCNCs") of the invention yield safe, economical, and highly effective rechargeable electrochemical cell electrode materials. The complementary high ionic and electronic activities of the amalgam nanodomains hitherto unattainable by attempted carbon mixture enhancement of the inherent electronic insulative property of otherwise ionically active metal halide compounds enable the remarkable high cycle rates, voltage ranges, and discharge capacities achieved with rechargeable cells of this invention.

5.1 Carbon Metal Fluoride Nanocomposites (CMFNCS) of the Invention

The CMFNCs of the invention can be employed in the manner of prior rechargeable electrochemical cell fabrication compositions and methods as the electroactive material of positive cell electrodes. Likewise, the negative electrode members of such cells may advantageously comprise any of the widely used lithium ion source materials, such as lithium metal, lithium alloys, e.g., LiAl, lithiated carbon, and lithiated metal nitrides. These nanocomposite electrode materials also function well with most other prior cell composition components, including polymeric matrices and adjunct compounds, as well as with commonly used separator and electrolyte solvents and solutes.

One of skill in the art can readily identify metals for use in metal fluoride compounds of the invention. Metal fluoride compounds useful in the invention include, but are not limited to, non-transition metals and transition metals, preferably, transition metals, more preferably, first-row transition metals. Specific examples of metals for use in metal fluorides of the invention include, but are not limited to, Fe (iron), Co (cobalt), Ni (nickel), Mn (manganese), Cu (copper), V (vanadium), Mo (molybdenum), Pb (lead), Sb (antimony), Bi (bismuth), or Si (silicon) or substituted derivatives thereof. Thus, compounds such as $FeF_2$, $FeF_3$, $CoF_2$, $NiF_2$, and $(NH_4)_xMe_yF_z$, where Me is a transition metal, $1 \leq x \leq 4$, $1 \leq y \leq 2$, and $4 \leq z \leq 6$, can be employed.

The conductivity of metal fluoride nanoparticles of the invention is increased by processing them with elemental carbon. Preferably, the elemental carbon is electrochemical cell grade carbon, such as acid-treated expanded graphite, activated carbon, and graphene chain conductive carbon black. While optimization of nanocomposite component ratios is well within the non-inventive purview of the knowledgeable artisan, good results in cell performance can generally be obtained from nanocomposites comprising from about 5% by weight of a carbon component to about 50% at which point the overall specific capacity of a cell may become impaired mathematically simply by the excessive weight of extraneous carbon component.

Nonaqueous electrolyte solutions commonly used in prior rechargeable electrochemical cell fabrication serve equally well in the cells of the present invention. These electrolyte compositions may thus comprise lithium salts such as $LiPF_6$, $LiBF_4$, $LiClO_4$, and the like, dissolved in the usual cyclic and acyclic organic solvents, such as ethylene carbonate (EC), dimethyl carbonate (DMC), propylene carbonate (PC), ethyl methyl carbonate (EMC), and mixtures thereof. As with the optimization of the nanocomposite materials, specific combinations of electrolyte components will be a matter of preference of the cell fabricator, although consideration may be given to the use of solutes such as $LiBF_4$ which appear less susceptible during cell cycling to hydrolytically forming HF which could affect the optimum performance of some metal fluorides. For such a reason, for instance, a $LiBF_4$:PC electrolyte may be preferred over one comprising a long-utilized standard solution of $LiPF_6$ in a mixture of EC:DMC.

Carbon metal fluoride nanocomposites of the invention are preferably prepared by extreme, high impact energy milling of a mixture of a metal fluoride compound and carbon. The procedure is described in detail in Badway et al., *Carbon-Metal Fluoride Nanocomposites Structure and Electrochemistry of $FeF_3$:C*, 150 J. ELECTRO. Soc. A1209-A1218 (2003) and Badway et al., *Carbon-Metal Fluoride Nanocomposites High-Capacity Reversible Metal Fluoride Conversion Materials as Rechargeable Positive Electrodes for Li Batteries,* 150 J. ELECTRO. SOC. A1318-A1327 (2003), both of which references are hereby incorporated by reference herein.

Thus, the carbon metal fluoride nanocomposite electrode materials of the invention can be prepared by using an impact mixer/mill such as the commercially available SPEX 8000 device (SPEX Industries, Edison N.J., USA). Unlike the shearing action of conventional planetary, roller, or ball mills which at best may provide size reduction to the micrometre range, the extremely high energy impact action impressed upon the component mixture by the impact mill provides, within milling periods as short as about 10 minutes, a particle size reduction of the processed material to the nominal nanostructure range of less than about 100 nm. Further milling for as little as 30 minutes up to about 4 hours brings about crystallite particle size reduction to less than about 40 nm with accompanying chemical changes such that the resulting material no longer exhibits, as in X-ray diffraction examination, the separate initial characteristics of the individual component compounds, but, although retaining major aspects of the transition metal fluoride, takes on the character of a new, highly electrochemically active material, termed herein as the transition metal fluoride: carbon (TMFC) nanocomposite.

The resulting nanostructure material, such a material being typically defined as having a predominant particle size of significantly less than 100 nm, comprises nanoparticles or nanocrystallites, of less than about 50 nm, preferably less than about 40 nm, and yields metal fluoride nanodomains exhibiting the high ionicity and ion conductivity of the fluoride compound while providing high electronic conductivity through an electron tunneling phenomenon supported in an interconnection of the nanodomains by the highly conductive carbon incorporated into the nanocomposite material.

Initial development of the invention centered upon the use of commercial iron trifluoride ($FeF_3$) and battery grade carbon black. Early combinations of these basic components comprised equal weight ratios in a conservative approach toward ensuring sufficient electronic conductivity. The remarkable performance observed upon evaluation of the resulting carbon metal fluoride nanocomposites, however, suggested that a shift to combinations of lesser carbon might be appropriate in order to yield greater specific cell capacity while retaining other desirable aspects of cell performance. Such variations to about 5% carbon proved successful, and further extensive testing of high quality cells were conducted with carbon metal fluoride nanocomposite electrode material prepared at about 15% carbon.

5.2 Lithium Fluoride Compound Nanocomposites ("LFCNCS")

In another embodiment, the invention is directed to lithium fluoride compound nanocomposites, which are useful in electrochemical cells, such as rechargeable batteries.

As used herein, the term "lithium fluoride compound nanocomposite" means nanoparticles comprising at least a "lithium fluoride compound" as defined below. The term "lithium fluoride compound nanocomposite" also includes nanoparticles comprising a lithium fluoride compound and an elemental metal and/or elemental carbon. Thus, in one embodiment, the lithium fluoride compound nanocomposites of the invention optionally comprise an elemental metal. And in another embodiment, the lithium fluoride compound nanocomposites of the invention optionally comprise elemental carbon. In still another embodiment, the lithium fluoride compound nanocomposites of the invention comprise both an elemental metal and elemental carbon.

As used herein the term "lithium fluoride compound" means any compound that comprises the elements of lithium (Li) and fluorine (F). Examples of lithium fluoride compounds include, but are not limited to, lithium fluoride (LiF) as well as compounds comprising lithium, fluorine, and a metal. Examples of lithium fluoride compounds that comprise lithium, fluorine, and a metal include, but are not limited to, compounds of the chemical formula $Li_yMeF_x$, where Me is a metal. Preferably, the values of x and y are adjusted, based on the oxidation state of metal Me, such that the lithium fluoride compound is neutral.

One of skill in the art can readily identify metals (Me in the equation $Li_yMeF_x$ above) for use in lithium fluoride compounds of the invention. Metals useful in metal fluoride compounds of the invention include, but are not limited to, non-transition metals and transition metals, preferably, transition metals, more preferably, first row transition metals. Specific examples of metals for use in lithium fluoride compounds of the invention include, but are not limited to, Fe, Co, Ni, Mn, Cu, V, Mo, Pb, Sb, Bi, or Si.

In another embodiment, the lithium fluoride nanocomposites of the invention comprise a lithium metal fluoride compound (as defined above) and optionally an elemental metal. One of skill in the art can readily identify suitable elemental metals. Elemental metals useful in the lithium fluoride nanocomposites of the invention include, but are not limited to, non-transition metals and transition metals, preferably, transition metals, more preferably, first row transition metals. Specific examples of elemental metals for use in the lithium fluoride nanocomposites of the invention include, but are not limited to, Fe, Co, Ni, Mn, Cu, V, Mo, Pb, Sb, Bi, or Si. Preferred elemental metals for use with the lithium fluoride compound nanocomposites of the invention include iron and bismuth. But many other elemental metals can be used. For example, a 2LiF:Co lithium fluoride compound nanocomposite (wherein cobalt is the elemental metal) can be formed through the reduction of a $CoF_2$ electrode using Li metal as the reducing agent. After the formation reaction, an extremely fine lithium fluoride compound nanocomposites of LiF and Co is formed as evidenced by the x-ray diffraction pattern shown in FIG. 27. In another example, an electrochemical cell having an electrode comprising a 2LiF:Co lithium fluoride compound nanocomposites as prepared above. After charging (removing Li) to 4.5V at 7.58 mA/g the cell was placed on discharge (FIG. 28). A discharge capacity of 350 mAh/g was observed. This electrode was also observed to be reversible.

In another embodiment, the lithium fluoride nanocomposites of the invention can comprise a lithium metal fluoride compound and optionally elemental carbon. The electrical conductivity of the lithium fluoride compound nanocomposites of the invention is increased by processing them with elemental carbon. Preferably, the elemental carbon is electrochemical cell grade carbon, such as acid-treated expanded graphite, activated carbon, and graphene chain conductive carbon black. Optimization of nanocomposite component ratios is well within the non-inventive purview of the knowledgeable artisan. Good results in cell performance can generally be obtained from nanocomposites comprising from about 5% by weight of a carbon component to about 50%.

In yet another embodiment, the lithium fluoride nanocomposites of the invention can comprise a lithium metal fluoride compound, an elemental metal, and elemental carbon.

Electrochemical cells employing the lithium fluoride nanocomposites of the invention as the positive electrode material can be prepared by well known methods. Nonaqueous electrolyte solutions commonly used in prior rechargeable electrochemical cell fabrication serve equally well in the cells of the present invention. These electrolyte compositions may thus comprise lithium salts such as $LiPF_6$, $LiBF_4$, $LiClO_4$, and the like, dissolved in the usual cyclic and acyclic organic solvents, such as ethylene carbonate (EC), dimethyl carbonate (DMC), propylene carbonate (PC), ethyl methyl carbonate (EMC), and mixtures thereof. As with the optimization of the nanocomposite materials, specific combinations of electrolyte components will be a matter of preference of the cell fabricator, although consideration may be given to the use of solutes such as $LiBF_4$ which appear less susceptible during cell cycling to hydrolytically forming HF which could affect the optimum performance of some metal fluorides. For such a reason, for instance, a $LiBF_4$:PC electrolyte may be preferred over one comprising a long-utilized standard solution of $LiPF_6$ in a mixture of EC:DMC.

The lithium fluoride compound nanocomposites of the invention preferably are of particle size of about 1 nm to about 100 nm, more preferably, of about 1 nm to about 50 nm, even more preferably, of about 2 nm to about 30 nm, still more preferably, of about 2 nm to about 15 nm.

5.2.1 Preparation of Lithium Fluoride Compound Nanocomposites of the Invention 5.2.1.1 Preparation by High-Energy Milling of Carbon Metal Fluoride Nanocomposites ("CMFNCs") with Stoichiometric Amounts of Lithium Metal The lithium fluoride compound nanocomposites of the invention can be prepared by high-energy milling of CMFNCs (as defined above) with stoichiometric amounts of lithium metal, for example, high-energy milling of FeF$_3$:C 85:15 wt %. High-energy milling of CMFNCs yields nanoparticles of the invention comprising LiF+M$^0$ according to the following equation. Carbon acts as a conducting matrix.

$$Me_xF_y+C+yLi \rightarrow yLiF+xMe+C$$

Analysis of the nanoparticles of the invention are shown in the XRD patterns of FIG. 19 where the phases are clearly identified.

The lithium fluoride compound nanocomposites of the invention can be fabricated into standard electrodes and incorporated into a standard electrochemical cell. As can be seen (FIG. 20), the material can be charged, removing Li (proving its viability for Li-ion). Furthermore, the electrochemical reaction is reversible resulting in appreciable specific capacity as is shown in the plot of specific capacity as a function of cycle number FIG. 21. Thus, the lithium fluoride compound nanocomposites of the invention generate appreciable reversible specific capacities with the voltage profiles of FIG. 21 mimicking those of the non-lithium containing CMFNCs of FIG. 12.

5.2.1.2 Preparation by High-Energy Milling of Lithium Fluoride and an Elemental Metal The lithium fluoride compound nanocomposites of the invention can be prepared by high-energy milling lithium fluoride and an elemental metal. The mixture of lithium fluoride and the elemental metal is milled intimately followed by introduction of conductive carbon and then a short high energy milling. The lithium fluoride compound nanocomposites prepared in this way are introduced into electrodes and placed into electrochemical cells. The materials were found to be electrochemically active giving appreciable specific capacities as is shown in FIG. 22.

In another procedure 3LiF+1Bi can be high-energy milled for 1 h in accordance with the above-described procedure. The 3LiF:Bi lithium fluoride compound nanocomposites of the invention so formed can then be milled with activated carbon for 1 h to enhance the internal conductivity of the lithium fluoride compound nanocomposites. Shown in FIG. 23 is the x-ray diffraction pattern of the lithium fluoride compound nanocomposites of the invention prepared in this way showing the retention of the LiF and Bi materials with broad Bragg peaks associated to the nanometric size. Electrochemical cells (see FIG. 24) were charged resulting in the reversible removal and reinsertion of Li+ from the structure at a desirable 3V.

5.2.1.3 Preparation by Ex-Situ Electrochemistry

The lithium fluoride compound nanocomposites of the invention can also be prepared by taking an electrode containing a carbon metal fluoride nanocomposite ("CMFNC"), such as FeF$_3$ and 15 wt % carbon, and placing it in direct contact with a reducing agent such as Li metal. In the latter technique, electrolyte (LiPF$_6$ EC:DMC) is added to facilitate ion movement. The chemistry is discussed in detail in Badway et al., *Carbon-Metal Fluoride Nanocomposites High-Capacity Reversible Metal Fluoride Conversion Materials as Rechargeable Positive Electrodes for Li Batteries*, 150 J. ELECTRO. SOC. A1318-A1327 (2003), which is hereby incorporated by reference herein. The reaction can be represented as follows:

$$Li^++e^-+MeF_x \rightarrow Li_yMeF_x$$

$$Li_yMeF_x+yLi^++xe^-(LiF+Me^0)$$

The values of x and y are adjusted, based on the oxidation state of metal Me, such that the lithium fluoride compound is neutral. Thus, the lithium fluoride metal compounds of the nanocomposites is Li$_y$MeF$_x$ and/or LiF+Me$^0$. For example, if the Me has oxidation states of 2$^+$ and 3$^+$, such as iron, the reactions can be represented as follows:

$$Li^++e^-+Fe^{3+}F_3 \rightarrow LiFe^{2+}F_3:C$$

$$LiFe^{2+}F_3+2Li^++2e^- \rightarrow (3LiF+Fe^0):C$$

Thus, the lithium fluoride compounds of the nanocomposites are LiFe$^{2+}$F$_3$ and/or LiF+Fe$^0$ depending on the quantity of the reducing agent.

XRD indicates extremely fine lithium fluoride compound nanocomposites of LiF and Fe (see FIG. 25). Electrodes comprising lithium fluoride compound nanocomposites, prepared accordingly, are placed in a standard electrochemical cell vs. Li metal. The cell is initially charged at 7.58 mA/g removing lithium and causing the voltage to rise (see FIG. 26). After coming to full charge at 4.5V the cell is discharged. The result is an outstanding discharge specific capacity of 530 mAh/g. Furthermore, after a subsequent recharge to 4.5V, the specific capacity recovered on the second discharge was almost identical to the first. The latter result gives evidence to the composite's excellent rechargeability.

5.2.2 Preparation of Electrodes for use with Lithium Fluoride Compound Nanocomposites of the Invention Electrodes for use with the lithium fluoride compound nanocomposites of the invention can be prepared by adding poly(vinylidene fluoride-co-hexafluoropropylene) (Kynar 2801, Elf Atochem), carbon black (Super P, 3M) and dibutyl phthalate (Aldrich) to the active materials in acetone. The slurry is tape cast, dried for 1 hour at 22° C. and rinsed in 99.8% anhydrous ether (Aldrich) to extract the dibutyl phthalate plasticizer. The electrodes, 1 cm$^2$ disks typically containing 57±1% active material and 12±1% carbon black can be tested electrochemically versus Li metal (Johnson Matthey). The Swagelock (in-house) or coin (NRC) cells are assembled in a He-filled dry box using Whatman GF/D glass fiber separators saturated with 1M LiPF$_6$ in ethyl carbonate: dimethyl carbonate (EC: DMC 1:1 in vol.) electrolyte (Merck). The cells are controlled by Mac-Pile (Biologic) or Maccor battery cycling systems. Cells were cycled under a constant current of 7.58 mA/g at 22° C., unless noted otherwise.

5.3 Electrochemical Characterization and Specific Capacity

Electrochemical characterization and measurement of specific capacity of rechargeable cells prepared with nanocomposites of the invention can be accomplished using standardized cell compositions and components according to well-known methods, for example, by adapting the procedures described in U.S. Pat. No. 5,460,904, the disclosure of which is incorporated herein by reference.

Procedures for analyzing the physical characteristics (e.g., XRD) and measurement of the specific capacity of nanocomposites of the invention are described in detail in Badway et al., *Carbon-Metal Fluoride Nanocomposites Structure and Electrochemistry of FeF$_3$:C*, 150 J. ELECTRO. SOC. A1209-A1218 (2003) and Badway et al., *Carbon-Metal Fluoride Nanocomposites High-Capacity Reversible Metal Fluoride Conversion Materials as Rechargeable Positive*

*Electrodes for Li Batteries,* 150 J. ELECTRO. SOC. A1318-A1327 (2003), both of which are hereby incorporated by reference herein.

For example, about 40 parts by weight of a carbon metal fluoride nanocomposite active material, 20 parts polyvinylidene:hexafluoropropylene copolymer (e.g., Kynar Flex 2801 PVdF:HFP), 8 parts Super P conductive carbon, and 32 parts dibutyl phthalate (DBP) plasticizer can be thoroughly mixed in sufficient acetone to provide a coatable paste which can be cast to a film of about 0.3 mm thickness from which the positive electrode members were cut. Test battery cells are prepared by extracting DBP from the positive electrode member with ether and assembling that member in a stainless steel coin cell with a lithium metal/stainless steel negative electrode member, an interposed borosilicate glass paper separator member, and an electrolyte solution, e.g., $LiPF_6$ in EC:DMC or $LiBF_4$ in PC solvent. Electrochemical testing of cells can be conducted in the usual manner with commercial automated, computer-controlled cycling and recording equipment. The above procedure is readily adapted for electrochemical cell formation and testing with lithium metal fluoride compound nanocomposites of the invention.

Preferably, the specific capacity of CMFNCs and LFCNCs of the invention is reversible and has a value of about 100 mAh/g to about 700 mAh/g at a voltage of about 2 volts to about 5 volts, preferably, 300 mAh/g to about 400 mAh/g, more preferably, of about 550 mAh/g to about 700 mAh/g.

The exemplary nanocomposite electrode material preparation and cell testing procedures and results described in the Examples section below provides further detailed description of the invention for the skilled technician and will enable additional non-inventive variations to be investigated.

6. EXAMPLES

6.1 Example I

Charges of equal parts by weight of $FeF_3$ and carbon black were milled in the high energy impact mill under a helium atmosphere for varying lengths of time before samples were extracted for structural and electrochemical characterization. As a basis for comparison, a measure of $FeF_3$ was thoroughly mixed under low energy shear grinding conditions in a mortar and pestle with an equal amount of carbon black to yield an electrode material mixture which duplicated in significant respects that of Arai et al., noted above, and is designated in the indicated test results and accompanying drawing as the "no mill" sample.

Figure 1:
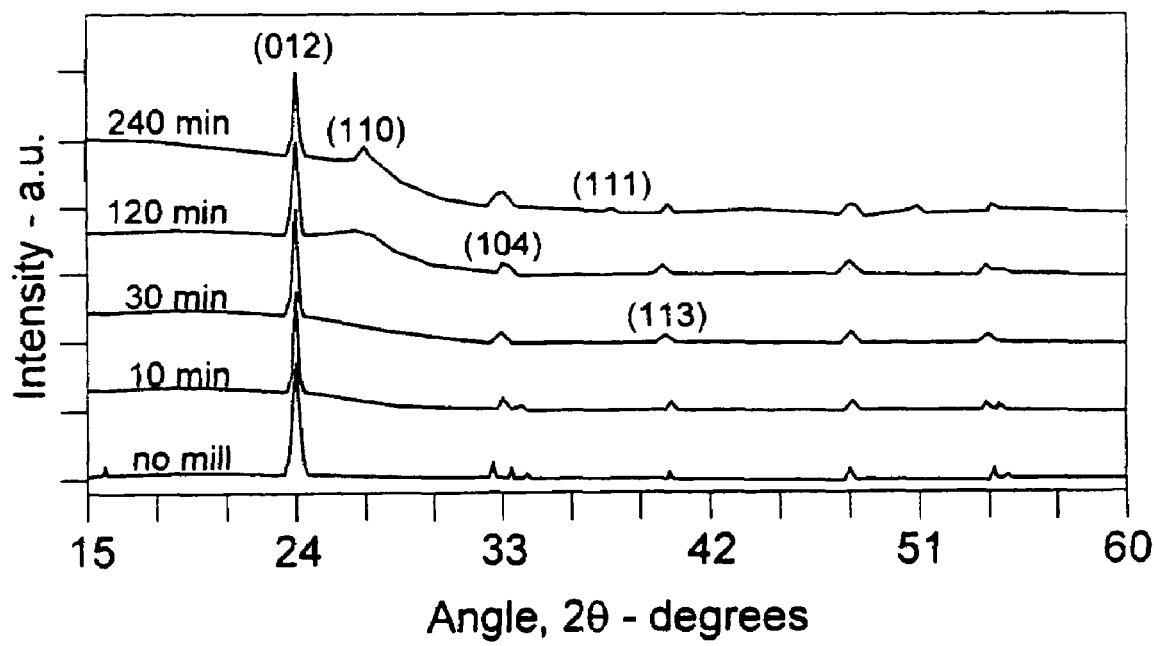
FIG. 1 depicts overlaid representations of XRD traces of carbon metal fluoride nanocomposite samples obtained from varying durations of high energy impact milling.
Figure 2:
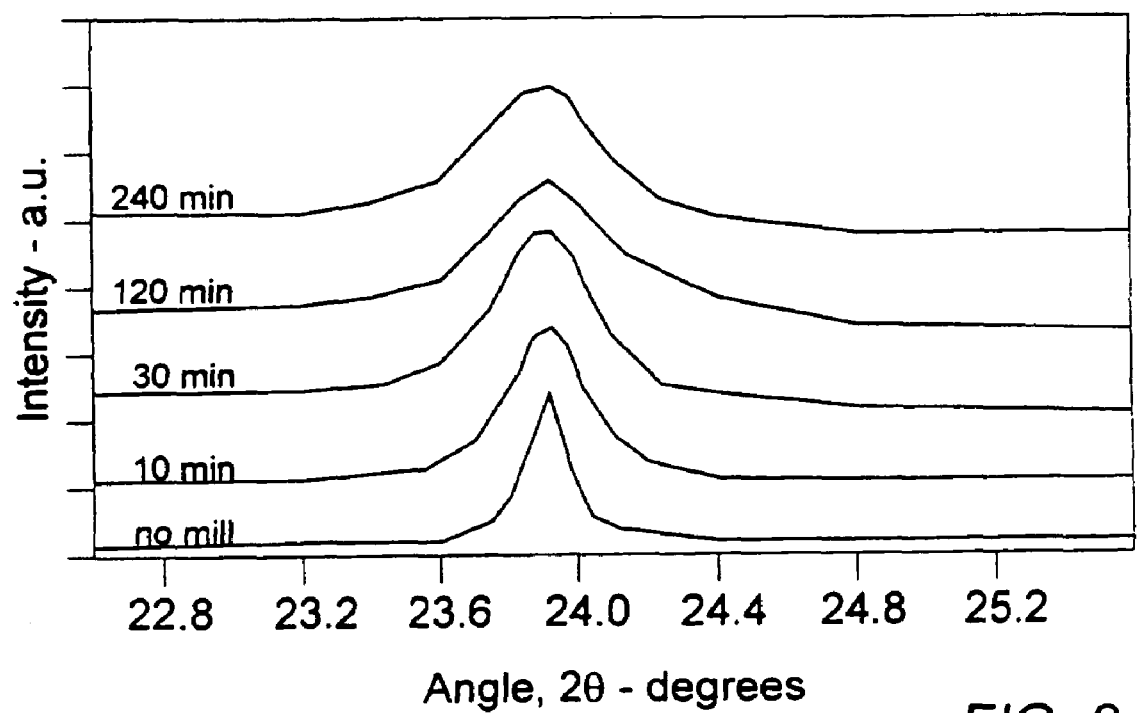
FIG. 2 depicts a section the traces of FIG. 1 in expanded scale highlighting the characteristic broadening of the major trace peak as a function of duration of such milling.
Figure 3:
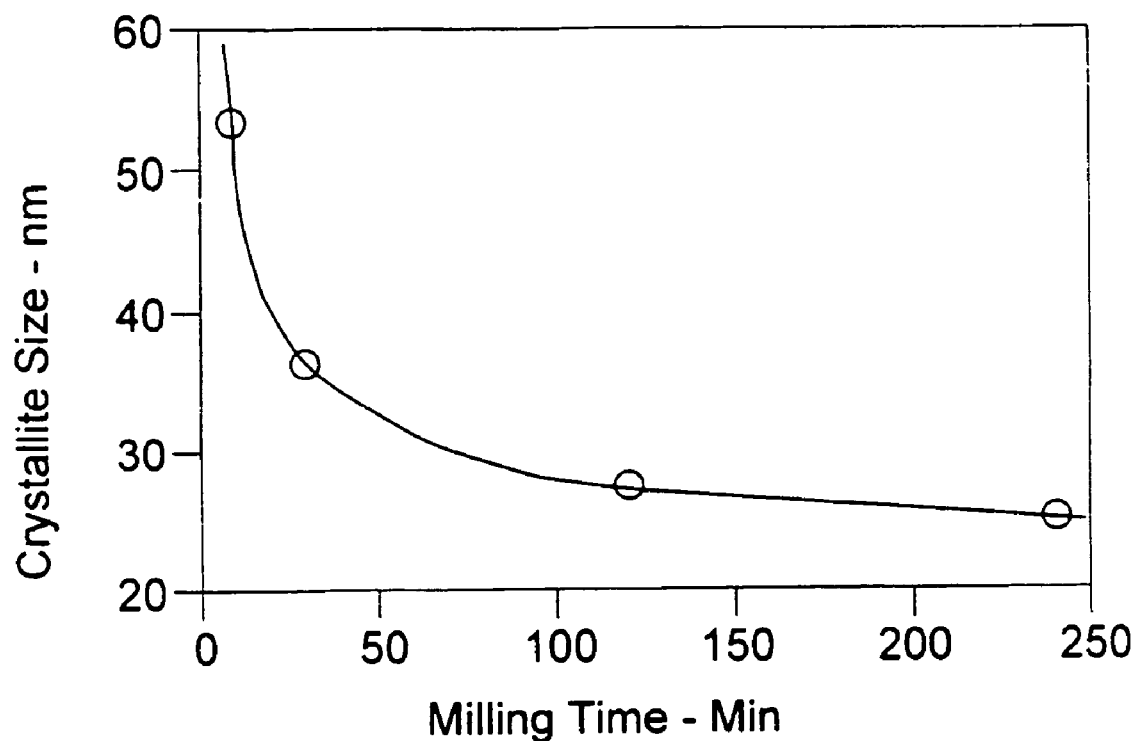
FIG. 3 is a graph plotting the variation in crystallite size of carbon metal fluoride nanocomposite material as a function of duration of such milling.

Samples of CMFNCs and the base reference mixture were characterized in laboratory XRD apparatus to obtain the traces represented in FIG. 1. There the changes in crystalline compound structure are apparent from the "no mill" mixture of $FeF_3$ and carbon through the initial formation of carbon metal fluoride nanocomposite at about 10 min milling to the more extensive reformation at about 4 h milling time at which, while the core structure of $FeF_3$ remains stable as indicated by the (012) Bragg peak, the appearance of the (110) peak signals significant development of $FeF_2$. Closer examination of the XRD traces reveals a systematic broadening of the major (012) peak which confirms a substantial reduction of TMFC amalgam crystallite size well into the nanostructure range below about 25 nm. Employing the XRD traces and the Scherrer formula, crystallite sizes were calculated to have systematically decreased from about 110 nm for the no mill mixture to the 25 nm nanostructure range after about 4 h milling, as depicted in FIG. 3. Additional milling appeared to have little significant effect in further reducing crystallite size, but promoted development of other compound forms, such as additional $FeF_2$ due to defluorination of the original precursor.

For characterization of the electrochemical efficacy as electrode materials of the range of carbon metal fluoride nanocomposites obtained above, a series of cells was fabricated in the above-described manner and tested at room temperature (22° C.) over a period of time at constant amperage cycles of 22 mA/g between 4.5 and 2.0 V. The substantially insignificant and unstable maximum capacity of about 50 mAh/g for the "no mill" electrode material mixture may be seen in the cycling charge/discharge voltage trace of FIG. 4. The results of similar testing for carbon metal fluoride nanocomposites of 10 and 30 min milling times are shown in FIG. 5, while the results obtained from 120 and 240 min milled materials appear in FIG. 6. The outstanding effect of the impact milled nanostructure particle size may be seen in the comparative discharge capacities of the various electrode materials over test period segments of 6 cycles are depicted in FIG. 7. An additional depiction of the effect of the reduction in nanocomposite electrode material crystallite size upon discharge capacity of cells comprising such materials is shown in FIG. 8.

6.2 Example II

A series of carbon metal fluoride nanocomposites was prepared from combinations of 85 parts by weight of $FeF_3$ and 15 parts of carbons of different composition and morphology. Exemplary carbon precursors utilized were an activated carbon (Norit) of microstructure dimension having a surface area of about 1700 $m^2/g$, a Super P conductive graphene chain carbon black (MMM Carbon), and an acid treated expanded graphite (Superior Graphite) having reduced particle size and partial exfoliation. Although some variations in the obtained carbon metal fluoride nanocomposite particle sizes were observed, as shown in FIG. 9, presumably as a result of the impact-tempering effect of the original carbon morphology, XRD and TEM examinations of these materials confirmed the characteristic nanostructure exhibited by the earlier sampled amalgams. Electrochemical characterization of the carbon metal fluoride nanocomposites was carried out with lithium cells prepared in the foregoing manner and comprising $LiPF_6$/EC:DMC electrolyte. These cells were tested over extended cycles at room temperature and a cycle rate of C/22 (7.58 mA/g) between 4.5 and 2.5 V with substantially the same remarkable capacity level and stability obtained with the previous nanocomposite electrode materials. Comparative third cycle discharge capacities and the effect of milling time are shown in FIG. 10. Baseline capacities obtained with electrode materials comprising "no mill" carbon mixtures were consistently well below 50 mAh/g.

6.3 Example III

In order to evaluate the novel carbon metal fluoride nanocomposite electrode materials of the present invention under cycling conditions more consistent with practical usage, a 60 min milled 85:15 $FeF_3$:activated carbon nanocomposite was prepared and used to fabricate a test cells as in Ex. II. The cells were then cycled repeatedly at 22° C. between 4.5 and 2.5 V at rates of 22.7 mA/g (C/5) and 68.18 mA/g (C/2.5), respectively, after two initializing cycles at 7.58 mA/g. Resulting exceptionally stable discharge capacities, as shown in FIG. 11, remained in the 150 mAh/g range.

6.4 Example IV

Test cells were prepared as in Ex. III comprising electrolytes of $LiPF_6/EC:DMC:PC:EMC$ and $LiBF_4/PC$, in addition to the $LiPF_6/EC:DMC$ of Ex. III. The cells were cycled in similar manner at the rate of 22.7 mA/g (C/5) for about 50 cycles. The results were substantially the same as obtained at that rate in Ex. III, the $LiBF_4/PC$ electrolyte exhibiting a somewhat greater capacity stability, while the $LiPF_6/EC:DMC:PC:EMC$ combination faired slightly less well.

6.5 Example V

Further examination of a cell of the invention as prepared in Ex. III revealed the surprising capability of carbon metal fluoride nanocomposite electrode materials to support rechargeable cell operation at elevated temperatures over wider voltage ranges than heretofore deemed practical. Such extended operational testing revealed exceptional, stable discharge capacity of about 560 mAh/g, nearly 80% of the theoretical capacity achievable in a complete 3 $e^-$ transfer resulting from complete reduction of $Fe^{3+}$ to $Fe^0$. In such testing, cells of Ex. III were cycled at the rate of 7.58 mA/g at 22° C. and 70° C. between 4.5 and 1.5 V. The resulting comparative profiles of cycling voltage shown in FIG. 12 reflect the surprising increase in capacity obtainable with the electrode materials of the present invention.

6.6 Example VI

A series of cells was prepared as in Ex. II with $FeF_3$ carbon metal fluoride nanocomposite electrode materials varying in carbon type and milling time. The cells were cycled at 70° C. as in Ex. V with the discharge capacities over the 4.5 to 2.5 V and the 2.5 to 1.5 V segments of the third cycle being determined. The comparative extraordinary discharge capacities obtained with the nanocomposites of the invention are shown in FIG. 13.

6.7 Example VII

Cells were prepared varying in carbon type and milling time as in Ex. VI, but utilizing a different transition metal fluoride, namely $FeF_2$, with the 15% carbon component to provide the carbon metal fluoride nanocomposite electrode materials. The cells were tested in the manner of Ex. VI with substantially similar high capacity performance results, as shown in the second cycle voltage profiles of respective cells comprising activated carbon metal fluoride nanocomposite electrode materials.

6.8 Example VIII

The implementation of the present invention in carbon metal fluoride nanocomposites derived from other metal fluoride compounds was confirmed in the preparation of such an electrode material from $NH_4FeF_4$ and activated carbon. The $NH_4FeF_4$ component was prepared by grind/mixing together an 8:1 molar ratio of ammonium fluoride (NHF) and iron oxalate ($FeC_2O_4H_2O$) and heating the mixture in an alumina crucible at about 400° C. in air for about 20 min with subsequent grinding and reheating for an additional 10 min. A carbon metal fluoride nanocomposite was prepared in the manner of the foregoing examples by 60 min high energy impact milling with 15% activated carbon. Cells of $FeF_3$ and $NH_4FeF_4$ carbon metal fluoride nanocomposite electrode materials were prepared with $LiPF_6/EC:DMC$ electrolyte and cycled as in Ex. VI. The comparative voltage profiles shown in FIG. 15 confirm the electrochemical efficacy of the derivative electrode material. The exceptional stability of the high discharge capacity of the $NH_4FeF_4$ carbon metal fluoride nanocomposite cell over a number of cycles is shown in FIG. 16.

6.9 Example IX

The utility of other metal fluorides in the present invention was confirmed in carbon metal fluoride nanocomposite electrode materials prepared from $NiF_2$ and $CoF_2$. Preparation of the electrode materials and test cells followed the processing of Ex. VIII with 15% activated carbon compositions and 60 min milling. Similar cycling over the 4.5 to 1.5 V range at 70° C. provided the comparative voltage profiles shown in FIG. 17 with respective discharge capacities shown in FIG. 18.

6.10 Example X

Lithium Fluoride Compound Nanocomposites

3LiF+1Bi was high energy milled for 1 h as described above. The 3LiF:Bi lithium fluoride compound nanocomposite was then milled with activated carbon for 1 h to enhance the internal conductivity. FIG. 23 shows the x-ray diffraction pattern of the as formed lithium fluoride compound nanocomposite showing the retention of the LiF and Bi materials with broad Bragg peaks associated to the nanometric size.

The lithium fluoride compound nanocomposites of the invention so prepared were then formed into electrodes by adding Poly(vinylidene fluoride-co-hexafluoro-propylene) (Kynar 2801, Elf Atochem), carbon black (Super P, 3M), and dibutyl phthalate (Aldrich) in acetone to form a slurry. The slurry was tape cast, dried for 1 hour at 22° C. and rinsed in 99.8% anhydrous ether (Aldrich) to extract the dibutyl phthalate plasticizer. The electrodes, 1 $cm^2$ disks containing 57±1% active material and 12±1% carbon black were tested electrochemically versus Li metal (Johnson Matthey). The Swagelock (in-house) or coin (NRC) cells were assembled in a He-filled dry box using Whatman GF/D glass fiber separators saturated with 1 M $LiPF_6$ in ethyl carbonate: dimethyl carbonate (EC: DMC 1:1 in vol.) electrolyte (Merck). The cells were controlled by Mac-Pile (Biologic) cycling system. Cells were cycled under a constant current of 7.58 mA/g at 22° C., unless noted otherwise. The cells were started on charge resulting in the subsequent removal and reinsertion of $Li^+$ from the structure at a desirable 3V. Confirming the reversibility of such metal lithium fluoride composites as extended to metals other than transition metals.

7. CONCLUSION

In view of the Summary, Drawings, and Detailed Description presented above, it is clear that the invention comprises the following embodiments:

In one embodiment, the invention is directed to a composition comprising a lithium fluoride compound demonstrating a specific capacity of about 100 mAh/g to about 700 mAh/g at a voltage of about 2 volts to about 5 volts.

In another embodiment, the invention relates to a composition comprising particles of about 1 nm to about 100 nm, wherein the particles comprise a lithium fluoride compound.

In yet another embodiment, the invention is direct to An electrochemical cell comprising: (a) negative electrode; (b) a positive electrode comprising a lithium fluoride compound; and (c) a separator disposed between the negative and positive electrodes, wherein the electrochemical cell demonstrates a specific capacity of about 100 mAh/g to about 700 mAh/g at a voltage of about 2 volts to about 5 volts.

In still one more embodiment, the invention relates to an electrochemical cell comprising: (a) negative electrode; (b) a positive electrode comprising particles of about 1 nm to about 100 nm, wherein the particles comprise a lithium fluoride compound; and (c) a separator disposed between the negative and positive electrodes.

In another embodiment, the invention is relates to a nanocomposite or nanoamalgam of a transition metal fluoride compound and carbon.

In yet another embodiment, the invention is directed to a rechargeable electrochemical cell comprising positive and negative electrode members comprising electrochemically active materials, and an interposed separator member including an electrolyte, wherein the electrochemically active material of one of said electrode members comprises a nanocomposite or nanoamalgam of a transition metal fluoride compound and carbon.

In still another embodiment, the invention relates to a method of making an electrochemically active rechargeable electrochemical cell electrode material which comprises mixing a transition metal fluoride compound with carbon and subjecting said mixture to a high energy impact comminution milling operation for a time sufficient to convert said mixture to a substantially uniform nanocomposite or nanoamalgam having a crystallite size of less than about 50 nm.

Although the present invention has been described in considerable detail with reference to certain preferred embodiments and versions, other versions and embodiments are possible and within the scope of the invention. Therefore, the scope of the appended claims should not be limited to the description of the versions and embodiments expressly disclosed herein.

What is claimed is:

1. A composition comprising a lithium fluoride compound demonstrating a specific capacity of about 100 mAh/g to about 700 mAh/g at a voltage of about 2 volts to about 5 volts relative to a Li/Li$^+$ reference potential wherein the lithium fluoride compound comprises particles of about 1 nm to about 100 nm.

2. The composition of claim 1, further comprising elemental carbon.

3. The composition of claim 1, further comprising an elemental metal.

4. The composition of claim 3, wherein the elemental metal is Fe, Co, Ni, Mn, Cu, V, Mo, Pb, Sb, Bi or Si.

5. The composition of claim 1, wherein the specific capacity is reversible.

6. The composition of claim 1, wherein the composition demonstrates a specific capacity about 550 mAh/g to about 700 mAh/g.

7. The composition of claim 1, wherein the lithium fluoride compound comprises LiF.

8. The composition of claim 1 wherein the lithium fluoride compound comprises a compound of the formula Li$_y$MeF$_x$ where Me is a metal other than Co, and wherein the values of y and x are such that, based on the oxidation state of metal Me, the lithium fluoride compound is neutral.

9. The composition of claim 8, wherein the Me is a transition metal.

10. The composition of claim 8, wherein the Me is Fe, Ni, Mn, Cu, V, Mo, Pb, Sb, Bi, or Si.

11. The composition of claim 8, wherein the lithium fluoride compound comprises LiFeF$_3$.

12. The composition of claim 1, wherein the lithium fluoride compound comprises particles of about 1 nm to about 50 nm.

13. The composition of claim 1, wherein the lithium fluoride compound comprises particles of about 2 nm to about 30 nm.

14. The composition of claim 1, wherein the lithium fluoride compound comprises particles of about 2 nm to about 15 nm.

15. A composition comprising particles of about 2 nm to about 15 nm, wherein the particles comprise a lithium fluoride compound.

16. The composition of claim 15, further comprising elemental carbon.

17. The composition of claim 15, wherein the lithium fluoride compound comprises LiF.

18. The composition of claim 15, wherein the lithium fluoride compound comprises a compound of the formula Li$_y$MeF$_x$ where Me is a metal and wherein the values of y and x are such that, based on the oxidation state of metal Me, the lithium fluoride compound is neutral.

19. The composition of claim 18, wherein the Me is a transition metal.

20. The composition of claim 18, wherein the Me is Fe, Co, Ni, Mn, Cu, V. Mo, Pb, Sb, Bi, or Si.

21. The composition of claim 18, wherein the lithium fluoride compound comprises LiFeF$_3$.

22. The composition of claim 15, further comprising an elemental metal.

23. The composition of claim 22, wherein the elemental transition metal is Fe, Co, Ni, Mn, Cu, V, Mo, Pb, Sb, Bi, or Si.

24. The composition of claim 15, wherein the composition demonstrates a specific capacity of about 100 mAh/g to about 700 mAh/g at a voltage of about 2 volts to about 5 volts relative to a Li/Li$^+$ reference potential.

25. The composition of claim 24, wherein the specific capacity is reversible.

26. The composition of claim 15, wherein the composition demonstrates a specific capacity about 550 mAh/g to about 700 mAh/g.

* * * * *

UNITED STATES PATENT AND TRADEMARK OFFICE
CERTIFICATE OF CORRECTION

| | | |
|---|---|---|
| PATENT NO. | : 7,371,338 B2 | Page 1 of 1 |
| APPLICATION NO. | : 10/721924 | |
| DATED | : May 13, 2008 | |
| INVENTOR(S) | : Glenn G. Amatucci | |

It is certified that error appears in the above-identified patent and that said Letters Patent is hereby corrected as shown below:

In the specification

Column 1, line 14, insert:

--GOVERNMENT RIGHTS
This invention was made with federal government support. Consequently, the government has certain rights in the invention.--

Signed and Sealed this
Thirty-first Day of May, 2016

Michelle K. Lee
*Director of the United States Patent and Trademark Office*